United States Patent [19]

McAvinney

[11] Patent Number: 4,746,770
[45] Date of Patent: May 24, 1988

[54] METHOD AND APPARATUS FOR ISOLATING AND MANIPULATING GRAPHIC OBJECTS ON COMPUTER VIDEO MONITOR

[75] Inventor: Paul McAvinney, Pittsburgh, Pa.

[73] Assignee: Sensor Frame Incorporated, Pittsburgh, Pa.

[21] Appl. No.: 14,943

[22] Filed: Feb. 17, 1987

[51] Int. Cl.$^4$ .................. G08C 21/00; G01S 5/16
[52] U.S. Cl. .................. 178/18; 340/365 P; 250/221; 250/224
[58] Field of Search .............. 178/18, 19; 340/365 R, 340/365 P, 712; 250/578, 221, 222.1, 224

[56] References Cited

U.S. PATENT DOCUMENTS

| | | | |
|---|---|---|---|
| 3,673,327 | 6/1972 | Johnson et al. | 178/18 |
| 3,739,372 | 6/1973 | Schlisser et al. | 340/258 B |
| 3,885,408 | 5/1975 | Clark, Jr. | 70/278 |
| 4,144,449 | 5/1979 | Funk et al. | 250/221 |
| 4,247,767 | 1/1981 | O'Brien et al. | 250/221 |
| 4,274,092 | 6/1981 | Vonusa et al. | 340/705 |
| 4,347,438 | 8/1982 | Spielman | 250/221 |
| 4,450,351 | 5/1984 | Fraden | 250/221 |
| 4,507,557 | 3/1985 | Tsikos | 340/36 PP X |
| 4,517,559 | 5/1985 | Deitch et al. | 340/712 |

OTHER PUBLICATIONS

Herot et al., "One-Point Touch Input of Vector Information for Computer Displays", IEEE Catalog, 1979, reprinted from *Computer Graphics*, vol. 12, No. 3, Aug., 1978, pp. 275-281.
Funk, "CCDs in Optical Touch Panels Deliver High Resolution", *Electronic Design*, Sep. 27, 1980, pp. 139-143.
Johnstone, "The Rolky: A Poly-Touch Controller for Electronic Music", ICMC '85, Proceedings, pp. 291-295.
Greene, "The Drawing Prism: A Versatile Graphic Input Device", Siggraph '85, vol. 19, No. 3, 1985, pp. 103-110.

*Primary Examiner*—Stafford D. Schreyer
*Attorney, Agent, or Firm*—Arnold B. Silverman

[57] ABSTRACT

A method of selection and/or manipulating graphic objects such as may appear on a computer video monitor is provided as is associated apparatus. A frame member cooperates with a plurality of optical sensors and a plurality of light occluding objects which tend to obstruct a portion of the light normally received by the optical sensors. The sensors are preferably dynamic RAM sensors. Determination of the position and orientation of the light occluding objects and, if desired, the velocity of the same, permits identification of or alteration of graphic objects. Fingers may be employed as the light occluding objects. This approach eliminates the need for burdensome identification of and changes to graphic objects through a computer keyboard or by means of a "mouse".

42 Claims, 25 Drawing Sheets

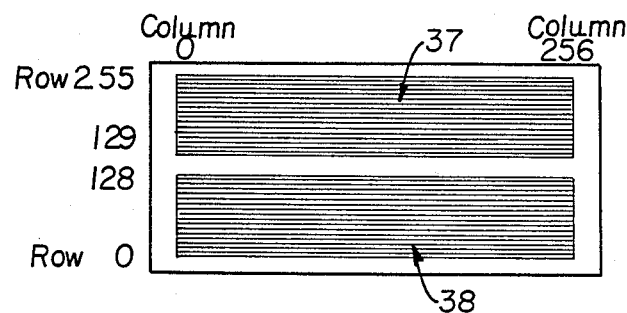
FIG. 2
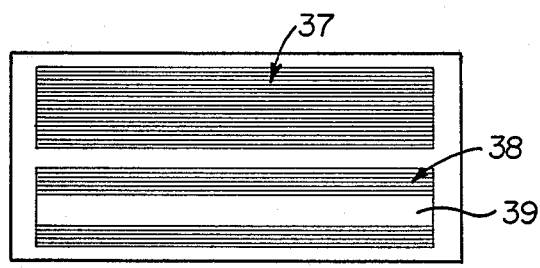
FIG. 3
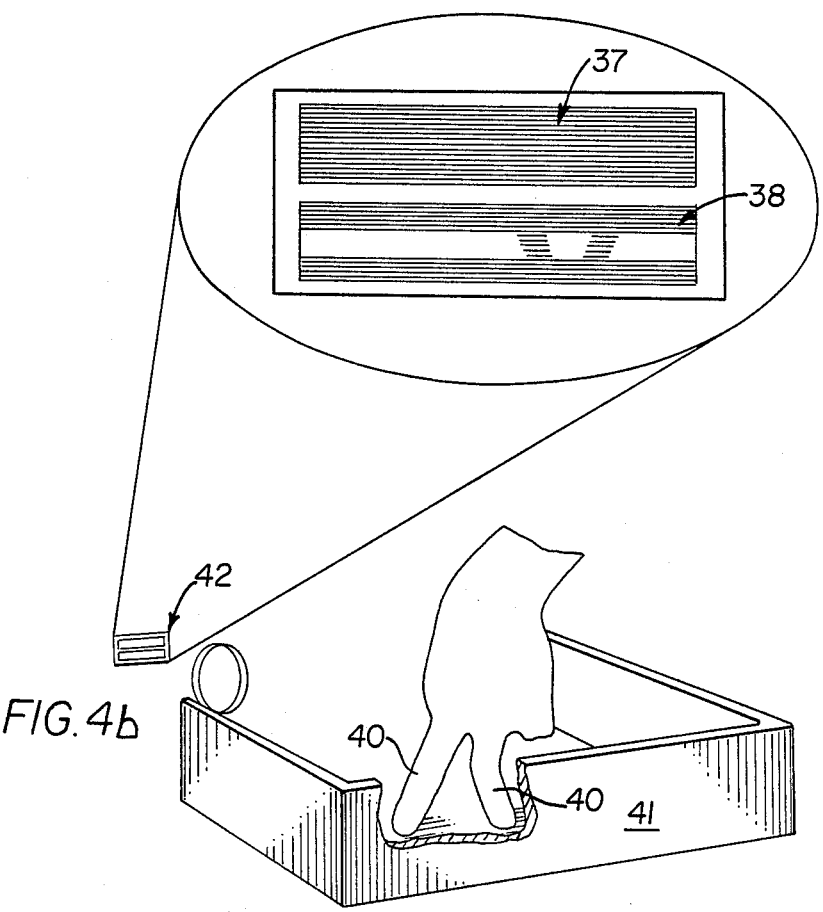
FIG. 4b
FIG. 4a

Time 1    Time 2

METHOD AND APPARATUS FOR ISOLATING AND MANIPULATING GRAPHIC OBJECTS ON COMPUTER VIDEO MONITOR

BACKGROUND OF THE INVENTION

1. Field of the Invention

The present invention relates to a method and associated apparatus for detecting position, spatial orientation and/or velocity of a plurality of light occluding objects by optical means and, more specifically, is adapted to be used beneficially in respect of computer terminal display monitors.

2. Description of the Prior Art

It has been known to employ, in respect of computers, various devices in lieu of conventional keyboard input for directing attention to a particular graphic object as by pointing. For example, light pens and the so-called "mouse" have been known as means for pointing to objects on a computer video monitor. It has also been known to permit such pointing to accomplish selection of alternatives from a limited menu.

It has been known to interrupt a plurality of beams with a single object and provide an indication of that single object. See, for example, U.S. Pat. Nos. 3,673,327 and 4,517,559. It has also been known to interrupt a widely-dispersed light beam to block some subset of an array of sensors. See U.S. Pat. No. 4,247,767.

It has also been known to employ a plurality of charge-coupled-devices (CCD) to determine the position within an x-y axis arrangement of a single object. See, also, "CCDs in Optical Touch Panels Deliver High Resolution", Electronic Design Sept. 27, 1980, pp. 139–143(a) and 43(b).

In spite of these prior art disclosures, there remains a very real and substantial need for a device which is adapted to provide a precision indication of position and spatial orientation of a plurality of objects and velocity of the same.

SUMMARY OF THE INVENTION

The present invention has met the above-described need. The method and apparatus of the present invention provide precise means for determining the position and spatial orientation and velocity of a plurality of graphic objects as hereinafter defined.

The method may employ providing a vodeo monitor, an adjacent frame illuminating the space within the frame and a plurality of optical sensors generally facing the frame interior. The method involves employing a plurality of light occluding objects to occlude a portion of the light reaching the sensors and emit signals from the sensors responsive to the position and intensity of light impinging on the individual elements of the sensors. The light occluding objects may be employed to isolate, select, refine or manipulate graphic objects on the video monitor.

The apparatus preferably has a frame disposed in front of a video monitor, illuminating means for providing uniform illumination and a plurality of dynamic RAM sensors for receiving at least a portion of the illumination.

The method and apparatus may be used for other purposes, such as producing music or another audible output, without using a video monitor.

It is an object of the present invention to provide a peripheral scan apparatus which will quickly and efficiently determine the position, angle or orientation and velocity of multiple objects introduced into the frame area.

It is a further object of the present invention to provide a method and apparatus for achieving the above-stated objective in order to permit efficient manipulation of graphic objects, such as translation, rotation, and scaling.

It is a further object of the invention to provide a method and apparatus for manipulation of position and orientation of graphic objects or components thereof, so as to permit composition and decomposition (assembly and disassembly) of such graphic objects.

It is yet another object of the present invention to provide such a system which will provide a real-time determination of sensed-object position, orientation and velocity and which is economical and easy to employ.

These and other objects of this invention will be more fully understood from the following description of the invention on reference to the illustrations appended hereto.

BRIEF DESCRIPTION OF THE DRAWINGS

FIG. 2 illustrates a form of sensor chip usable in the present invention.

FIG. 3 illustrates the sensor chip of FIG. 2 with a light source focused on the chip.

FIGS. 4a and 4b, respectively, illustrate a hand partially occluding the light and the resultant pattern on the sensor chip.

(FIGS. 41, 42a, 42b and 43 are to be combined by portions which have matching letters A through E.

DESCRIPTION OF THE PREFERRED EMBODIMENTS

As used herein, the term "graphic object(s)" means one or more textual elements, graphic elements or combinations of both displayed on a computer video monitor or the like.

As used herein, the term "light occluding object(s)" means one or more opaque objects which occlude at least a portion of the light which would otherwise impinge on an optical sensor. This expression shall expressly include but not be limited to fingers, feet, elongated physical objects such as wands, pencils, brushes and other items suitable for such purposes.

As used herein the term "frame" or "frame member" means an assembly providing one or more sources of light and a plurality of sensors for receiving at least portions of such light regardless of frame size, including but not limited to continuous closed frames of rectangular, square, circular or other shapes, or frames having discontinuities, structures having no frame shape in the conventional sense but having the desired light source(s) and number of sensors in the desired positions.

Figure 1:
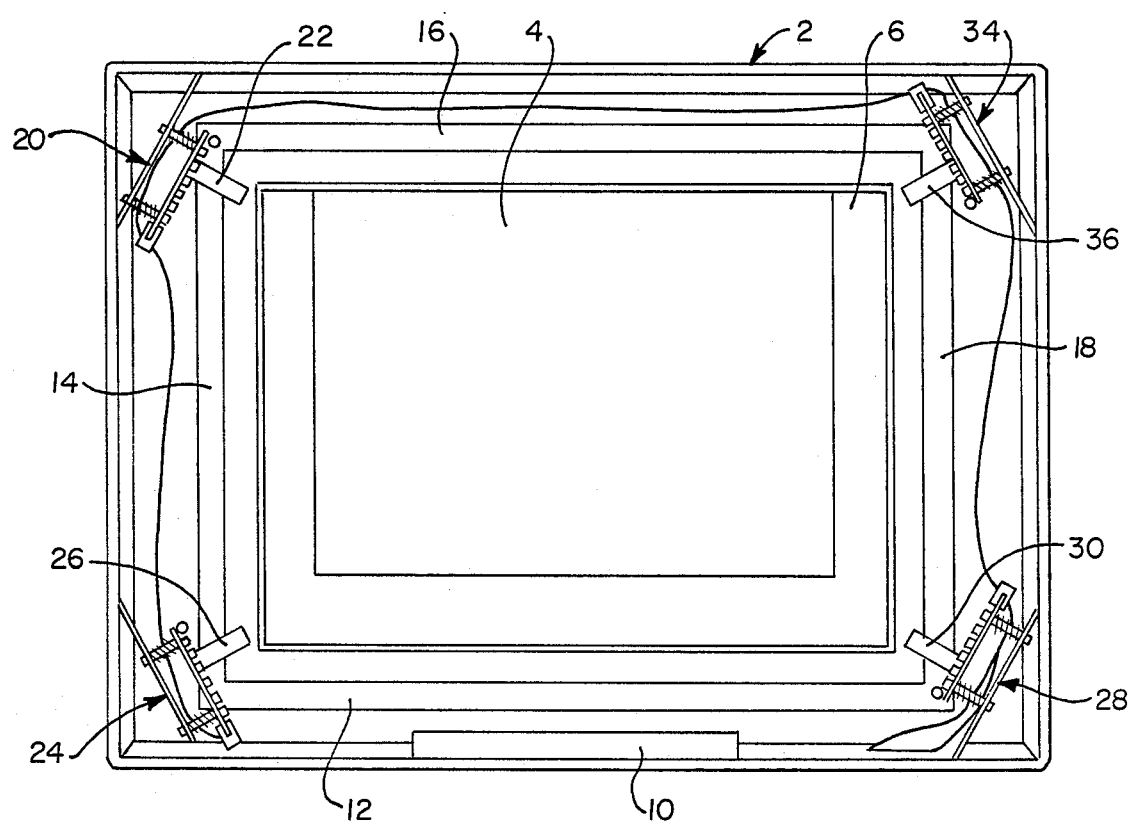
FIG. 1 is a schematic illustration of a form of the present invention.

FIG. 1 shows a generally rectangular frame member 2 which may have a frame housing made of metal or a suitable resinous plastic, for example. It is preferably disposed in front of a video monitor of a computer in close adjacency thereto. The frame member 2 in the form illustrated, has a display image region 4 and may optionally have an offset region 6. The light source may advantageously be a neon tube which is excited by a light source exciter 10 and is positioned within a light source diffuser having sections 12, 14, 16, 18. If desired, a suitable light source filter may be provided in order to maintain the light within the desired intensity range. This serves to provide substantially uniform illumination for the entire inner opening of the frame.

In the form illustrated, a group of preferred optical sensors are provided in the corners of the frame and are mounted on printed circuit panels whose angular orientation is adjustable. Each optical sensor preferably has focussing lenses disposed within a suitable housing so as to focus precisely light received from the frame interior upon the sensor cells. Sensor assembly 20 has associated lens system 22, sensor assembly 24 has associated lens system 26, sensor assembly 28 has associated lens system 30 and sensor assembly 34 has associated lens system 36.

In order to facilitate maximum efficiency in use of the present system, it is preferred that the sensor assemblies 20, 24, 28, 34 make use of dynamic RAM chips. A 64K RAM, for example, may consist of two separate rectangular arrays of 32,768 cells each having 128 by 256 cells. It is preferred that a rectilinear, as distinguished from linear array, be employed in order to provide the z-axis positioning information desired in the present invention. By using more widely separated rows of the rectilinear array and providing a correspondingly thick light source, increased capability to measure the z-axis position and angle may be provided. The sensors function as cameras obtaining a silhouette picture. Each individual cell in this type of sensor will either have an output of zero if the light impinging on it is of sufficient predetermined intensity or will have an output of one if the intensity is not at such a level. A suitable solid state sensor for use in the present invention is that sold under the trade designation IS32 OpticRAM by Micron Technology, Inc. Of Boise, Id.

The preferred sensors of the present invention use dynamic random-access memories as optical sensors. Among the advantages of these types of sensors over other solid-state optical sensors such as charge-coupled devices are that they allow uncomplicated random access to any point in the visual field in microseconds, they do not send gray-scale information, thereby facilitating ease of edge detection, they are easy to interface with and they are relatively inexpensive.

It is preferred that the preferred sensor employed in the present invention have rectilinear arrays of cells in order to facilitate determination of the position of objects in the x, y and z axes framework. In making the initial determination that an object is present in the screen region being monitored, only a linear array of the sensor elements needs to be employed. In making determinations regarding orientation such as the angle of a finger, for example, two or more linear arrays of sensor cells would be monitored. Use of the z-axis is then involved.

Referring still to FIG. 1, the display image region 4 may be the area in which the graphic objects will be displayed from the computer. The offset region 6 which is not required, but is preferred, may advantageously be employed in those instances where it is desired that interpretations of the meaning of a gesture by a light occluding object or objects be fed back to the user in the form of some visible manifestation of the interpretation and that the visible manifestation be visible to the user without being occluded by the user's hand. The offset region 6 may be employed for this purpose. For example, if the graphic object is to be moved it might be displayed two inches to the right of the user's hand so that the hand will not block the user's view of the object. If the user now wants to move the object to the left edge of the screen, a two inch offset region at the left will allow the user to do this as the hand can be sensed beyond the left edge of the screen.

For convenience of reference herein, the combination of the frame 2, the controller, the light source, the diffuser and the sensors will be referred to by the trademark "Sensor Frame" or "Sensor Frame device".

FIG. 2 shows a sensor chip of the type used in the present invention. The chip has two spaced arrays 37, 38 of sensor cells of equal size. Although the preferred sensor is a dynamic RAM chip, it may use any device which senses light using an array of discrete sensors, such as a charge-coupled device (CCD).

In a dynamic random access memory (DRAM) chip, a cell, which corresponds to a bit, may be in one of two states, conventionally referred to by those skilled in the art as a "one" or a "zero".

DRAM chips come in many sizes, most commonly containing a number of cells or bits, which is some power of two. The DRAM chips currently preferred for use in the Sensor Frame device are "64K DRAMS", which actually contain 65,536 bits, arranged as two rectangles (see FIG. 2), each containing 32,768 bits, or cells. The cells are sensitive to light in the "near infrared" region of the spectrum. Each 32K-bit rectangle is arranged as 128 rows and 256 columns.

Larger (or smaller) DRAMS could easily be used, if desired. Each DRAM has one input line (i.e. wire) for reading data (a 1 or 0) into a cell; and one output line for reading data out of the cell. A cell is selected for reading or writing by presenting an "address" (which in the case of a 64K DRAM is a 16-bit number) to the DRAM. While in practice, most 64K DRAMS have only 8 "address lines" for reading an address, the method of presenting a 16-bit address to a DRAM with only 8 address lines is called "multiplexing" and is well known to those skilled in the art.

Once an address is presented to a DRAM, a 1 or 0 may be written into it, or a previously stored value (either a 1 or 0) may be read out.

In the Sensor Frame device, "ones" are written into those DRAM cells which correspond to locations in the visual field to be scanned. The DRAM cells are then exposed to light, with the exception of those that are blocked by a finger or other occluding object. The individual cells consist partially of very small capacitors, which hold an electrical charge corresponding to a "1". All cells with "ones" written into them will eventually lose their charge, but those exposed to near infrared light will lose charge much more quickly, becoming "zeroes". With a light source of appropriate intensity, and a carefully-selected exposure time, cells which are blocked by fingers will contain "ones", and cells not blocked will contain "zeroes" after exposure.

In the present invention is fixed, continuous light source is used to provide a pattern of light (usually, but not necessarily, a rectangle), which is focussed on the chip. FIG. 3 shows the light from a uniform-intensity rectangular light source focused by a lens system (not shown) on one of the sensor chips used in a sensor frame. The white bar 39 represents that portion of the chip upon which the light from the rectangular light source falls. —

If one or more objects, such as human fingers 40, are placed between the light source 41 and the lens/sensor assembly 42, the objects will occlude light from part of the light source. The shadow of the objects provides, in effect, a silhouette, or outline of the shape of the light-occluding objects on the sensors. FIGS. 4a and 4b illustrates this phenomenon.

Although it might seem preferable to eliminate the need for a light source by forming an image using light reflected from the object, as in a camera, this method is not preferred for several reasons. First, the intensity of reflected light depends upon two factors which are extremely difficult to control in practice i.e. the reflectivity of the sensed object and the intensity of ambient light. Furthermore, even when very high-intensity light is used for object illumination, the intensity of reflected light, and the image contrast available, will be considerably less than that obtainable using the light-occlusion method described herein. This state of affairs tends to lengthen the required exposure time, making anything like real-time performance and image disambiguation extremely difficult outside a laboratory environment.

Figure 5:
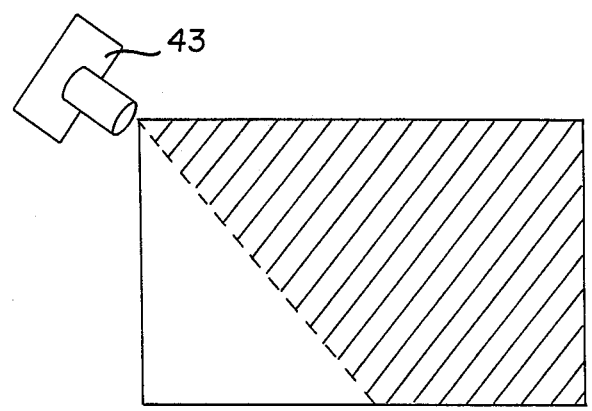
FIG. 5 is a schematic illustration showing the field of view of a first sensor.
Figure 6:
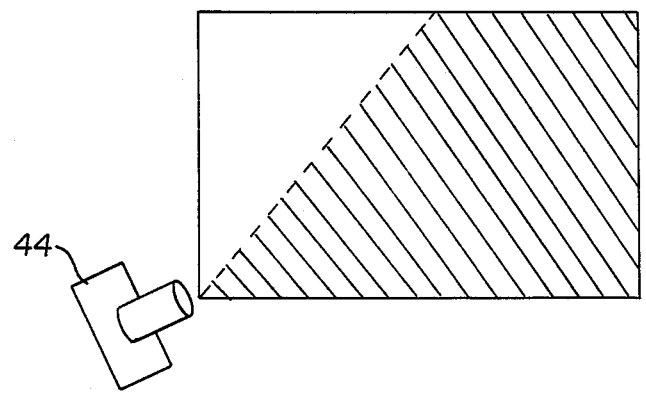
FIG. 6 is a schematic illustration showing the field of view of a second sensor.
Figure 7:
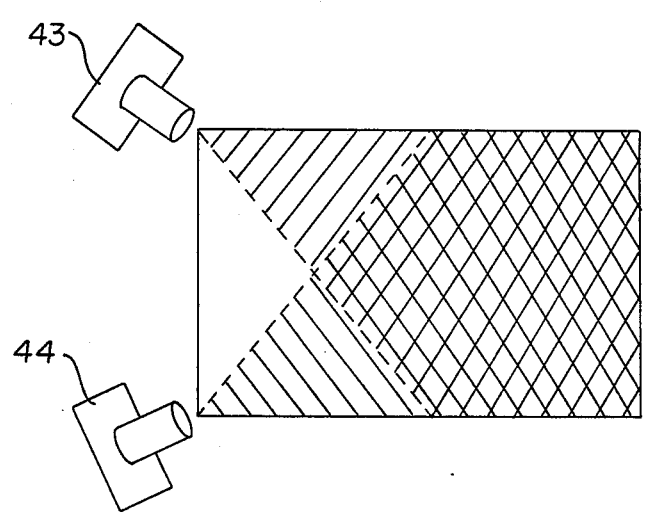
FIG. 7 is a schematic illustration showing the fields of view of both sensors of FIGS. 5 and 6.

Because of optical design constraints, it is generally not practical to sense a ninety-degree field of view from each sensor, nor is it practical to use the information from a sensor which is very close to the sensed object. For this reason when calculating position, the present invention uses information only from those sensors which reside on the edge of the frame generally opposite the object. For example, if the aspect ratio of a rectangular Sensor Frame device is such that it is wider than it is high, the top and bottom left sensors will be used to calculate position of objects in the right half of the frame, and the top and bottom right sensors will be used to calculate position of objects in the left half of the frame. FIGS. 5 through 7 illustrate this case, with the cross-hatched areas within the frame showing the areas scanned by each sensor 43, 44.

Position of the occluding objects is determined by pairing adjacent sensors (usually, but not always, the two adjacent sensors on a short side of a rectangular frame), and then using the known distance between the sensors (the baseline distance) and the interior angles formed by lines passing from each sensor through the visual center of the object. This "angle-side-angle" information is sufficient to permit calculation of the x,y position of an object.

Figure 8:
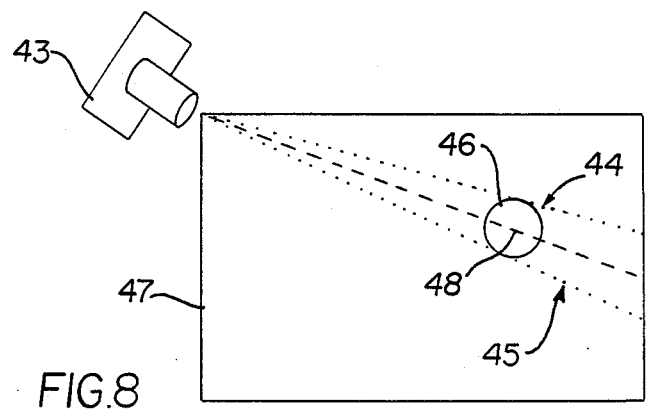
FIG. 8 is a schematic illustration showing the silhouette aspect of sensor measurement.
Figure 9:
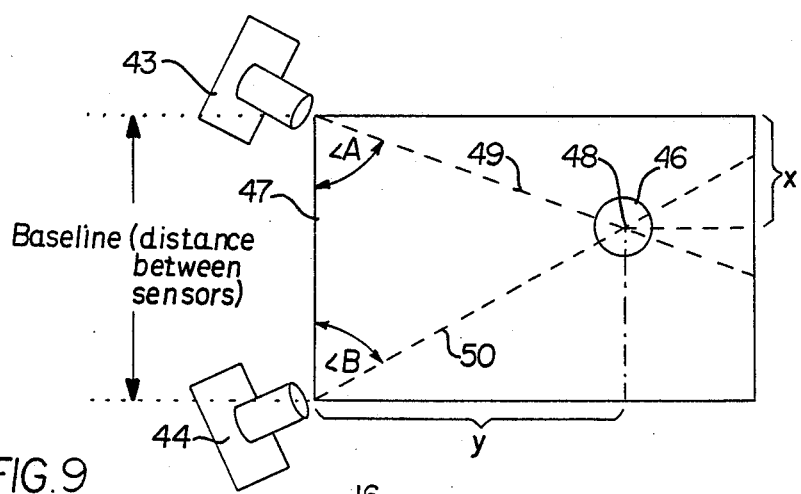
FIG. 9 is a schematic illustration of the geometric relationships between a pair of sensors and the sensed object.

FIGS. 8 and 9 show this process in more detail. FIG. 8 shows that the sensor 43 actually sees only the left and right edges 44, 45 of an occluding object 46. The Sensor Frame device controller stores numbers which represent the angles between the baseline 47 (the side of the frame between two sensors which are paired for purposes of position determination) and the left and right edges of the sensed object 46. Two numbers are stored; the first number corresponds to the angle between the baseline and the left edge of the object, and the other number corresponds to the angle between the baseline and the right edge of the object. This pair of edges is stored by the controller for each object seen by each sensor. The controller's internal table containing these numbers is called the raylist. Each left-edge-angle/right-edge-angle pair is an entry in the raylist and is called a "ray".

The average of the left-edge angle and the right-edge angle for an object represents the angle of a line passing through the visual center 48 of that object (FIGS. 8 and 9). The visual-center angles to an object from two adjacent sensors are used to calculate an object's position.

FIG. 9 shows angle A, the angle between the baseline 47 and the line 49 passing from the top-left sensor through the visual center of the object as seen from the top-left sensor; and angle B, the angle between the baseline and the line 50 passing from the bottom left sensor through the visual center 48 of the object as seen from the bottom-left sensor. Angles A and B and the known length of the baseline 47 are "plugged into" the angle-side-angle trigonometric formulas to obtain readily the x and y position of the visual center of the object.

One of the objectives of the present invention is to detect positions, angles, and velocities of multiple light occluding objects in real-time. It is desired, for example, to provide an inexpensive means of recognizing rich classes of complex gestures quickly enough to control a vehicle or musical instrument in real-time.

There are two fundamentally different approaches to optical, or vision-based gesture recognition. These may be classified as the "perspective scan" and "peripheral scan" methods. The perspective scan method places a video camera either above or below the user's hand. The advantage of this approach is that the whole hand can be seen at once. The disadvantage is that it is slower and about an order of magnitude more expensive, in terms of hardware costs, than the approach described herein.

The Sensor Frame device is a peripheral-scan sensing device. Although it is inherently much faster than a perspective-scan device, it presents two potential problems. One potential problem is occlusion. In a peripheral-scan device, the user's fingers may block one-another, making tracking difficult. The architecture of the Sensor Frame device makes it possible to track occluded (blocked) fingers by maintaining a history of the movement of their edges. A second potential problem is ambiguity. It is possible for two different finger position configurations to produce the same pattern on a pair of sensors. This aliasing effect will be referred to herein as "pattern ambiguity". The problem can be solved using a method which will be referred to as "temporal disambiguation". Briefly stated, one can select between two or more possible finger configurations by scanning quickly enough i.e. —with high-enough temporal resolution, to know which fingers arrived first in the visual field, and therefore which fingers are real.

Figure 10:
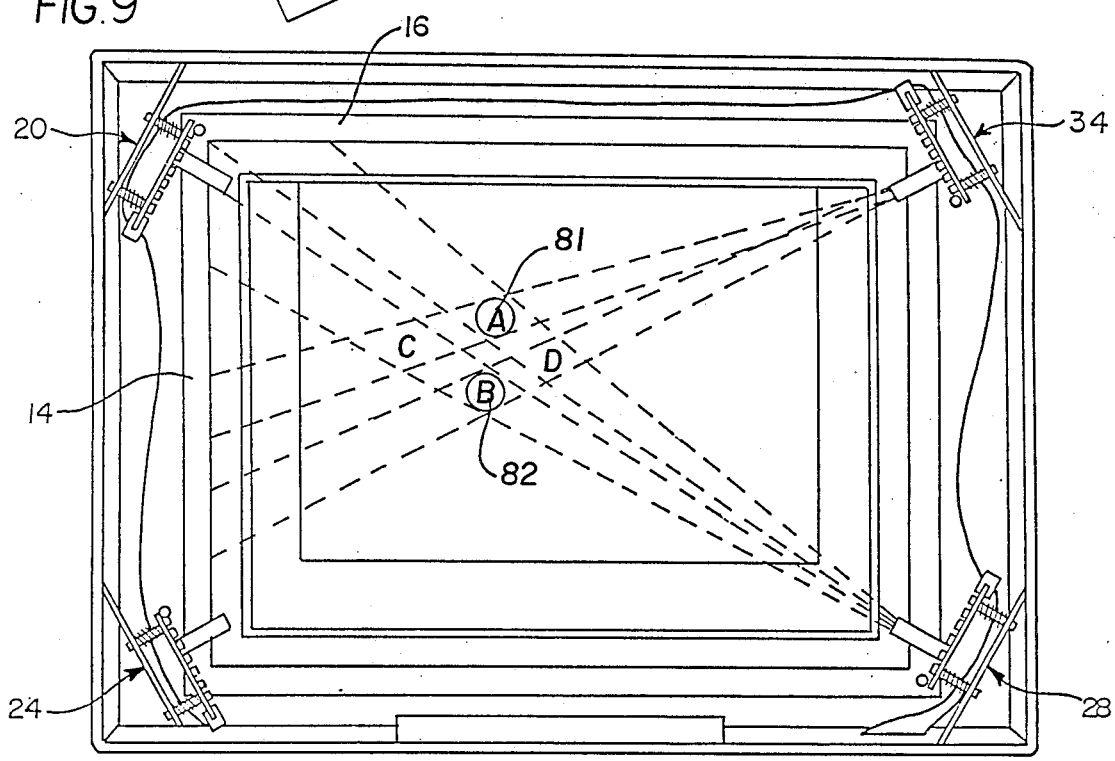
FIG. 10 is a schematic illustration of a form of frame wherein two light occluding objects are present.
Figure 11:
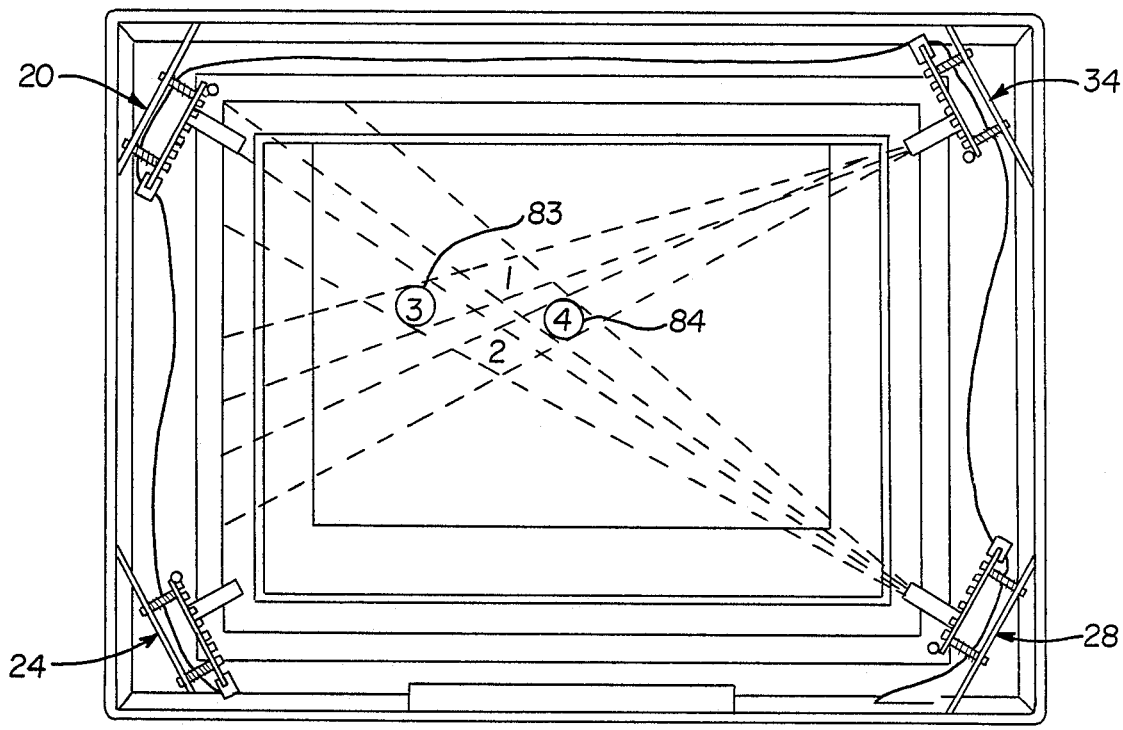
FIG. 11 is a schematic illustration similar to Figure 10 but with the light occluding objects in a different position.

FIG. 10 shows the effect of two fingers 81, 82 entering the visual field of the pair of sensors 28, 34 on the right. Between the fingers and the sensors are the "rays" produced by the silhouettes of the fingers occluding the light source. For each scan of the Sensor Frame device visual field, a list of these rays (called a raylist) is compiled for each sensor. Note that there are four areas A, B, C, D where the rays overlap. The same ray overlap pattern can be created by either a vertical arrangement of fingers, as shown (the fingers are at positions 81 and 82 in FIG. 10), or a horizontal arrangement (as with fingers 83 and 84 in FIG. 11), resulting in ambiguity regarding which of the two patterns is the real one. This pattern ambiguity may be resolved by a number of means. These include but are not limited to: temporal disambiguation i.e. —keeping track of which finger arrived first, use of additional sensors, and knowledge-based disocclusion, wherein knowledge of user physiology and/or tools, such as the size of the user's fingers, is used.

If it were desired to employ the system to rotate a graphic object 90 degrees, for example, a user could position two fingers in the vicinity of the video monitor which contain the graphic object. The fingers could then be rotated as a unit. The system would determine the initial location, the direction and the extent of rotation and would, through the computer, effect responsive rotation of the graphic object in the desired direction through a 90 degree arc.

A further example of uses of the system would be to have fingers point to a graphic object on a monitor screen and determine the angle of the fingers with respect to the z-axis. This could serve as an instruction to the computer to move that particular graphic object, and the finger angle relative to the z axis would determine the direction in which it is to be moved. Withdrawal of the finger could serve to provide an instruction to stop moving the graphic object.

Figure 12A:
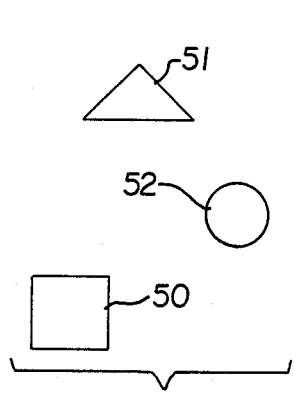
FIGS. 12a–12c are schematic illustrations of how fingers may be employed to select graphic objects.
Figure 12B:
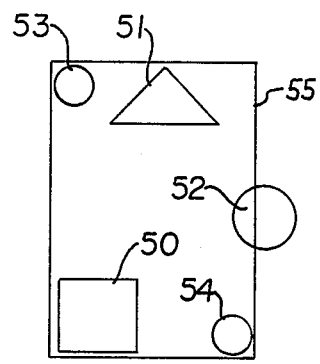
Figure 12C:
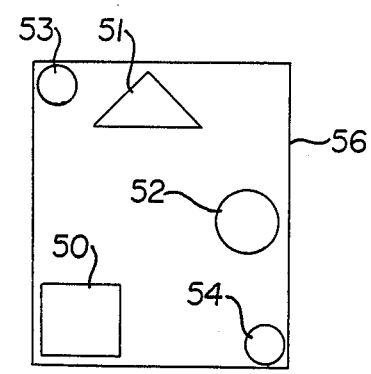

FIGS. 12a through 12c show how multiple (in this case two) fingers might be used to select the displayed objects upon which to perform an operation. In FIG. 12a frame at left are a square 50, a triangle 51, and a circle 52. In FIG. 12b, the user's fingers 53,54 are used to determine the diagonally-opposite corners of a rectangle 55, whose size and position are determined by the fingers 53,54. Any object falling completely inside the rectangle 55 will be operated upon, and any object not completely within the rectangle 55 will not be operated upon. In FIG. 12b, for example, the square 50 and triangle 51 are selected, but the circle 52 is not. In FIG. 12c, all three objects are within the rectangle 56 and all are selected.

Figure 13:
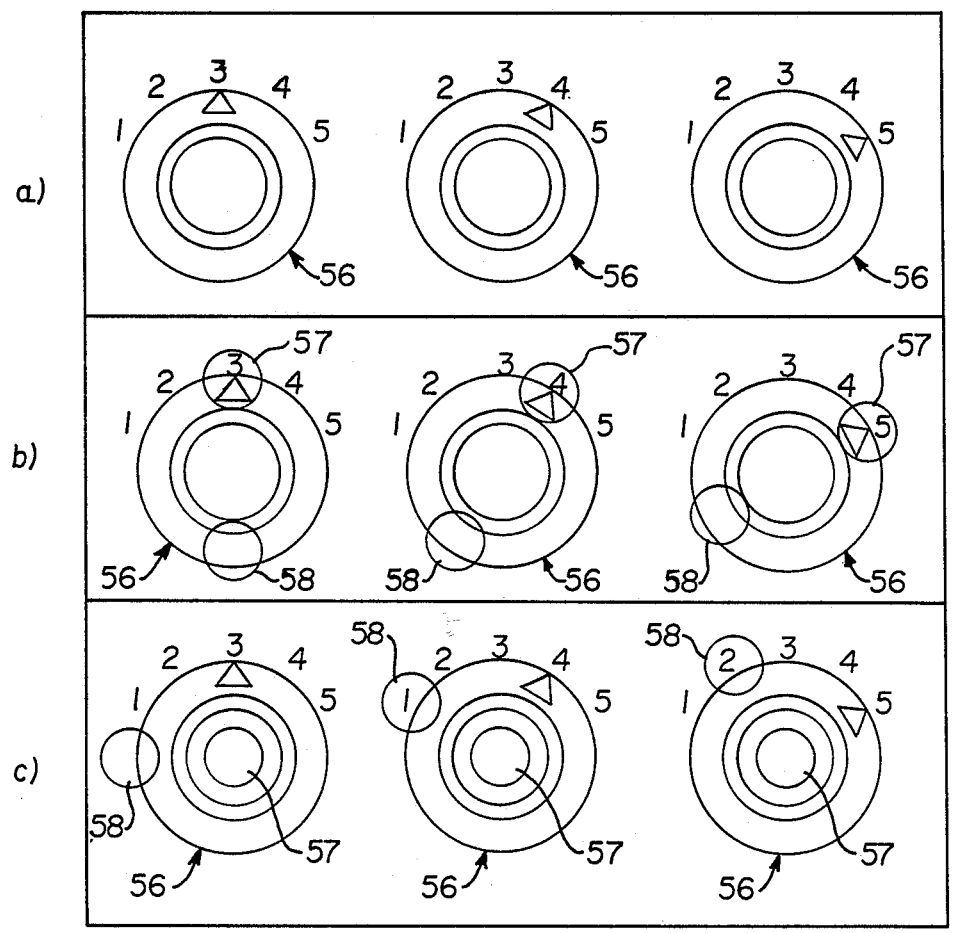
FIG. 13 is a schematic illustration showing how manipulation can be achieved through the use of fingers.

FIG. 13 shows how two fingers can be used to rotate a knob in a control panel displayed on a video monitor. Row (a) shows a knob 56 with five detent positions, pointing respectively to positions 3, 4 and 5. In row (b), as fingers 57, 58 are rotated in a clockwise fashion, the Sensor Frame device provides their positions to the panel-control program. The knob 56 turns responsively to reflect the position of the fingers 57, 58. Although the row (b) sequence shows the fingers 57, 58 positioned above and below the knob, exact positioning need not be critical; and in sequence, the same effect can be achieved if one finger 57 is over the center of the knob 56 and the other finger 58 is at the knob periphery, for example (See row (c)). All that is really important in this application of the Sensor Frame device is that the fingers be in the vicinity of the knob, and that they be rotated through an angle sufficient to cause the knob to rotate to the desired detent position.

Figure 14A:
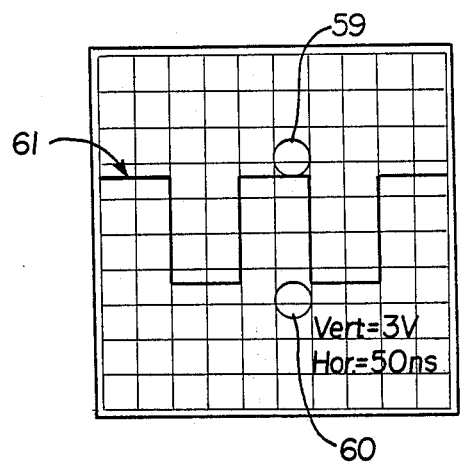
FIGS. 14a and 14b are schematic illustrations of multiple-finger control of instruments.
Figure 14B:
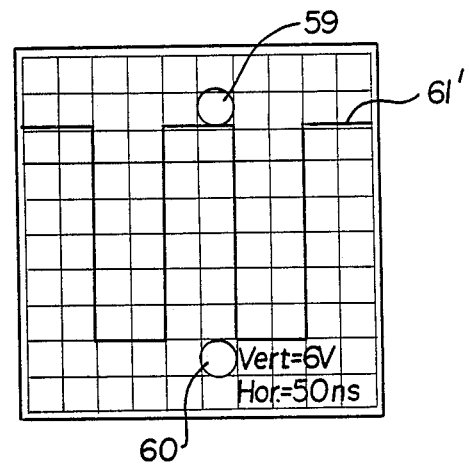

FIGS. 14a and 14b illustrate how multiple-finger gestures can be used to control sophisticated instruments such as oscilliscopes, logic analyzers, or waveform function generators. In these figures, two fingers 59, 60 are used to control the frequency and amplitude of a square wave 61 produced by a waveform function generator.

In FIG. 14a, the user has placed fingers 59, 60 respectively near the top and bottom peaks of the displayed waveform. FIG. 14b shows what happens when the fingers 59, 60 are moved apart. The amplitude of the generated waveform changes (in this case it increases) in proportion to the movement of the fingers 59, 60 to create waveform 61'.

Figure 15A:
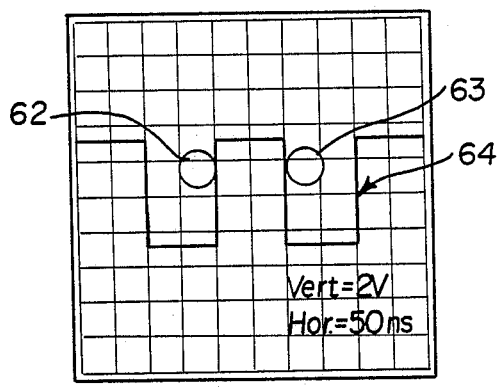
FIGS. 15a and 15b are schematic illustrations of the use of multiple-fingers in scaling.
Figure 15B:
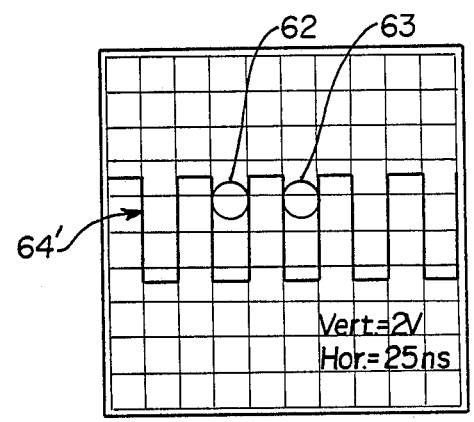

FIGS. 15a, 15b show the same method applied to frequency scaling. The user has oriented two fingers 62, 63 horizontally in the left illustration, and then moved them closer to each other, decreasing the period (and therefore increasing the frequency) of the generated waveform 64, 64'.

It will be appreciated that these figures show examples of the "control panel" applications of the Sensor Frame device and that other uses and more sophisticated uses of these types of gestures can be achieved.

Figure 16:
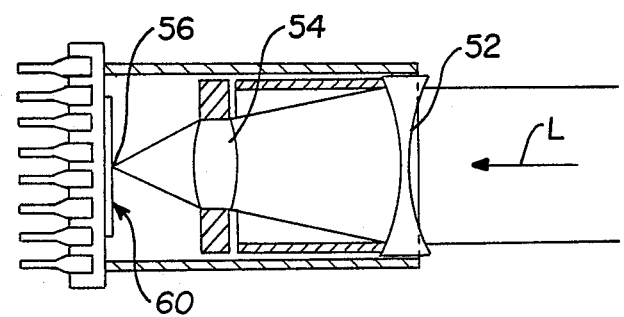
FIG. 16 is a cross-sectional, schematic illustration of a form of lens/optical sensor coupling construction.

Referring to FIG. 16 there is shown a form of optical system and dynamic RAM sensor arrangement preferred for use as sensors in the present invention. Parallel rays from the frame interior are shown entering as indicated by the arrow at "L". A pair of spaced focussing lenses 52, 54 causes the entering light to focus at 56 so as to focus an image of occluding objects disposed in the frame onto the sensor array 60. By way of example, a primary lens at the front may be a $\frac{3}{8}''$ focal-length double concave lens and the secondary lens 54 a $\frac{1}{4}''$ focal-length double convex lens.

Figure 17:
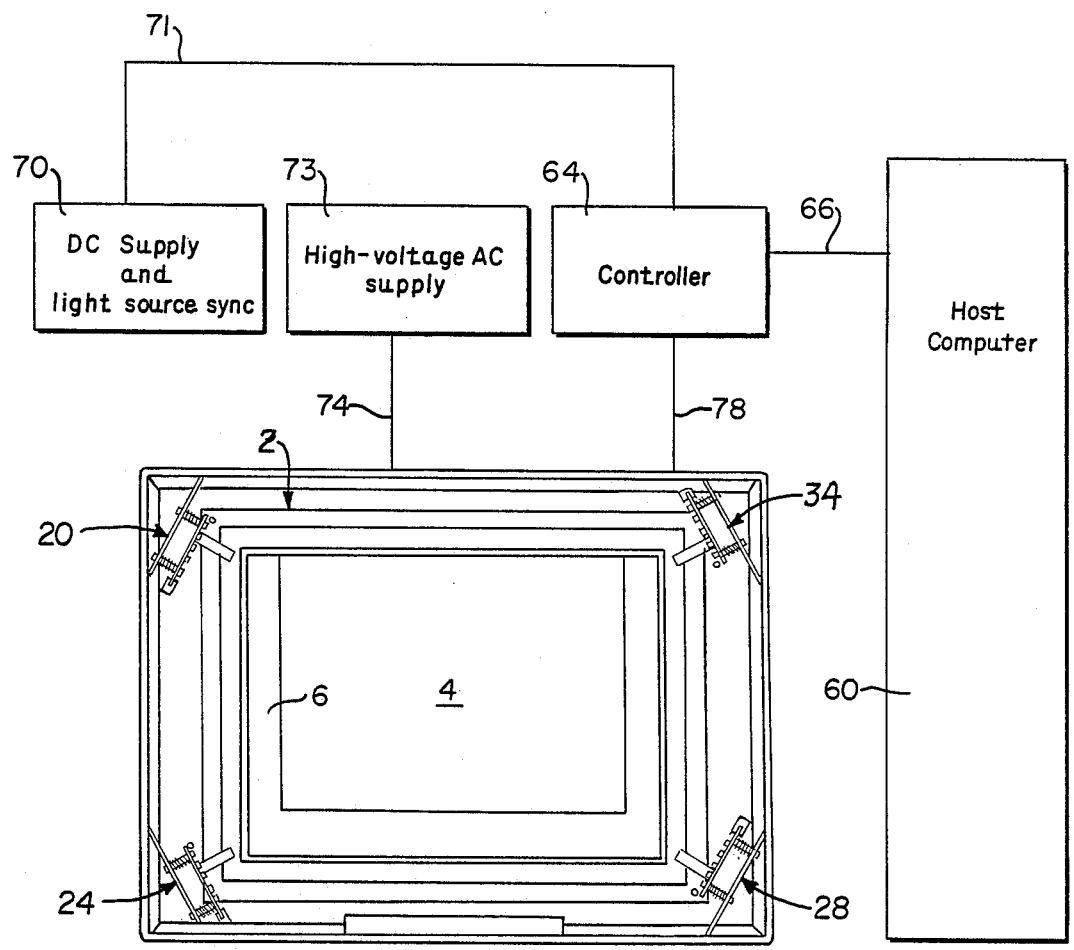
FIG. 17 is a partial schematic illustration of an embodiment of the present invention.

FIG. 17 illustrates a "stand-alone" embodiment of the invention. A host computer 60 is connected to controller 64 by a cable 66. The DC supply and light-source synchronization component 70 is connected to the controller 64 by a cable 71. High voltage AC power supply 73 is connected to the frame light source by a high voltage cable 74. Controller 64 is connected to the frame sensor assemblies 20, 24, 28, 34 by cable 78. In operation, the high-voltage supply 73 energizes the light source. If desired, the controller 64 may be provided as a component within the housing of the host computer 60.

When an object such as a human finger blocks the image of the light source, a shadow with edges corresponding to the edges of the occluded object appears in the sensor's focused image. The term "ray" as used herein refers to the shadow cast by the occluding object. As the object moves, the rays move correspondingly.

In one embodiment of the invention the host computer 60 has the (a) "TrackObjects" function which determines the x, y and z axis coordinates of the occluding objects and (b) the "TrackRays" function which maintains a history of the rays for each sensor. The preferred embodiment, however, executes these functions in the controller 64.

The controller 64 builds raylists which are lists of rays seen in the latest exposure of the sensors. The raylists may be transferred from the controller 64 to the host computer 60 as input to the ray tracking and object tracking software. This transfer may be effected about every 30-35 milliseconds, for example. The raylist is established in the controller 64 by scanning the sensors. The host computer 60 maintains the raylists for each sensor. "Raypaths" contain the last n samples extracted from the raylist for a given sensor for a given object, where n is application dependent. A linked list of raypaths for each sensor is referred to as a path list. A "simple raypath" is one sensor's completely unoccluded view of an object, such as a finger, for example. A "cluster" is a raypath having a doubly-linked sublist of raypaths wherein each entry in the sublist is a raypath representing one sensor's view of a partially occluded or fully occluded object. By comparing the information provided in each subsequent raylist with prior raylists the changes in object position, orientation and velocity can be determined. This information can be employed to alter a graphic object on the video monitor.

It will be appreciated that various means for providing software to perform the functions required in the method and apparatus of the present invention may be employed. The following will illustrate and describe what is presently deemed by applicant to be the best mode of accomplishing the same.

Figure 18:
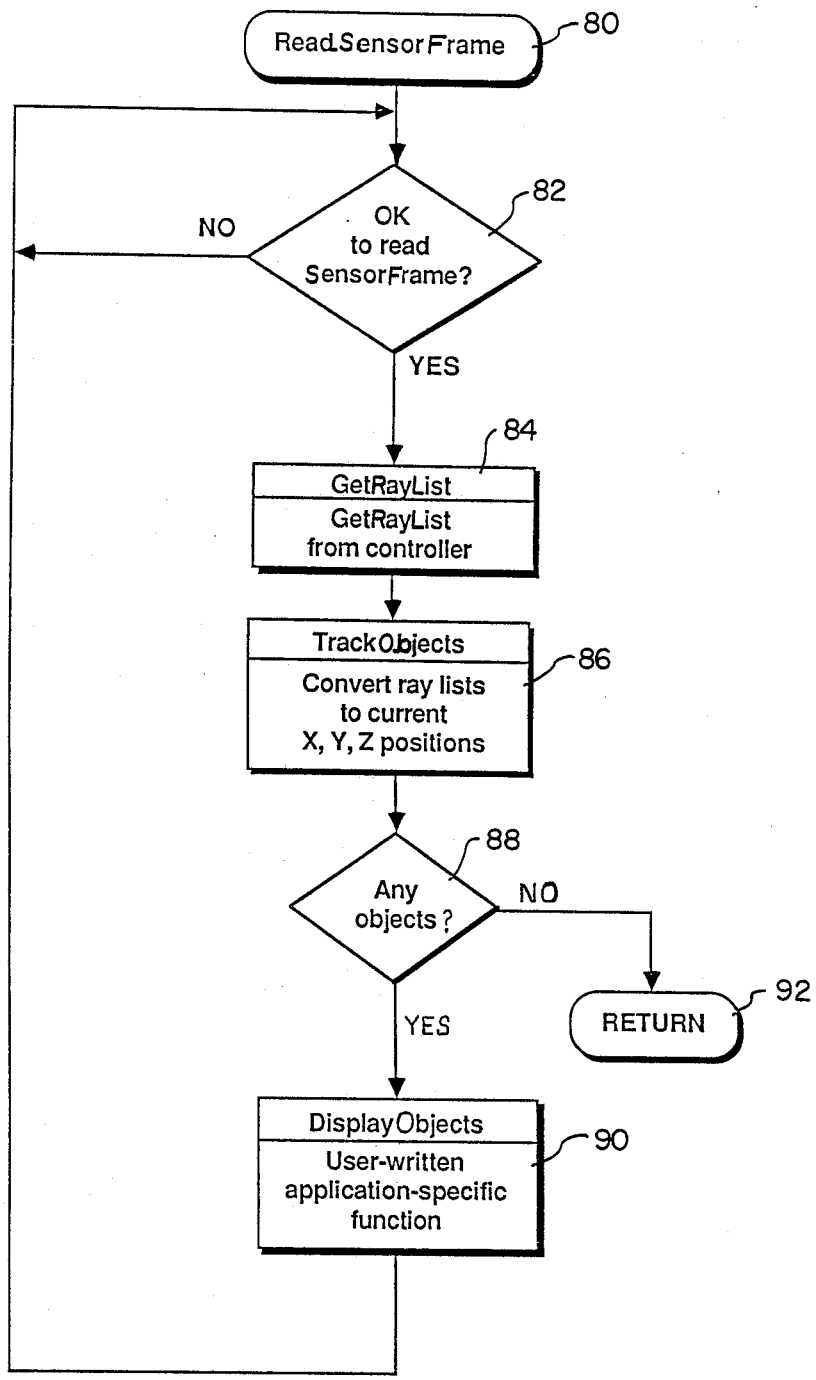
FIG. 18 is a flow diagram of a user function employed to read the frame.

FIG. 18 shows a flow diagram for an application function employed to obtain a list of objects from the Sensor Frame device. At the beginning of the ReadSensorFrame function 80 it is determined at 82 whether the Sensor Frame has any new data. If so, an updated raylist is obtained from controller 64 by calling the GetRayList function 84 and then the TrackObjects function 86 is called. If any objects are found in the list returned by the TrackObjects function 88, the user program displays the objects on the video terminal using the DisplayObjects function 90. If no objects are found, the function returns 92.

Figure 19:
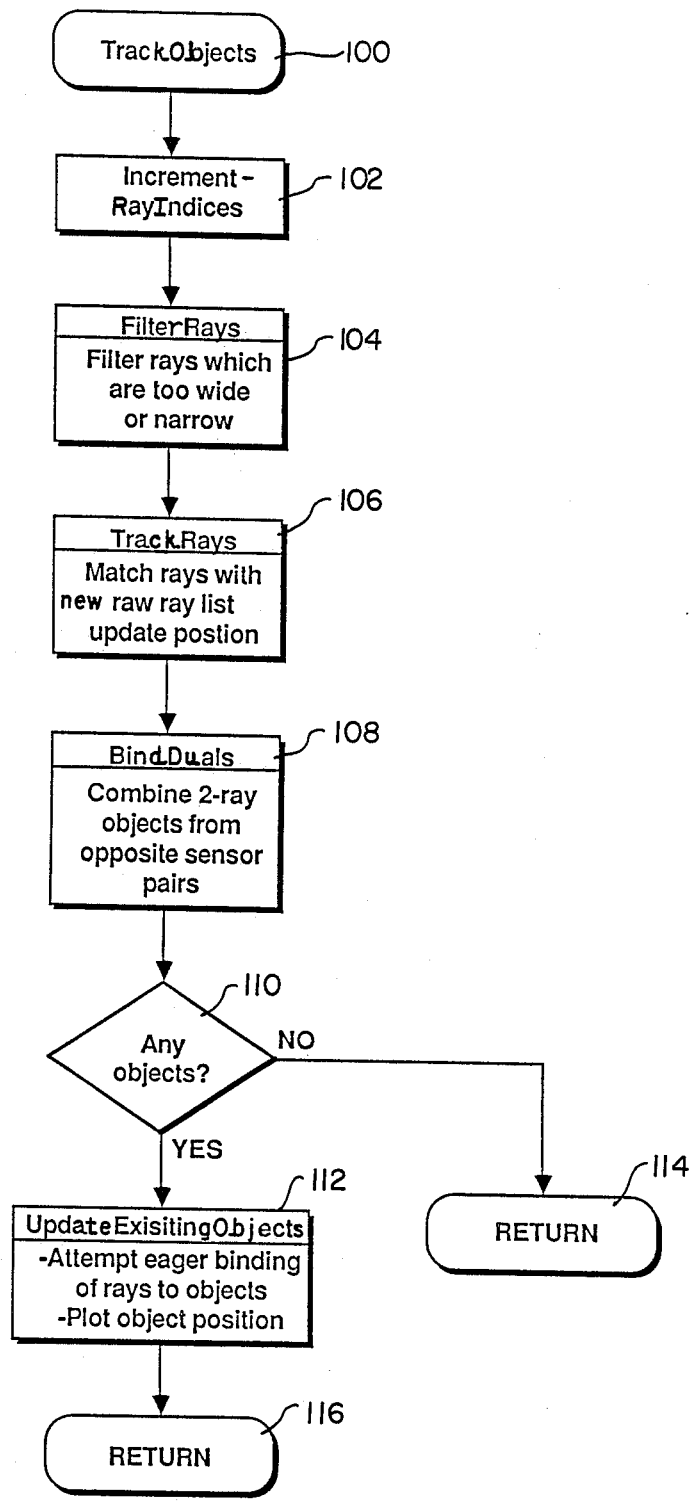
FIGS. 19 through 20 are flow diagrams of portions of software employable in the invention.

FIG. 19 illustrates a flow diagram for the TrackObjects function for use in tracking objects. This function employs four other functions to identify new objects and track the movements of the objects already known.

At the beginning of the TrackObjects function 100 the "ray indices" are incremented 102. This causes all updated ray information to be written into a circular buffer, allowing information about previous samples of a ray to be retained until they are no longer needed. Past ray information is used, for example, to obtain velocity by taking the difference between a current ray position and a previous position.

The FilterRays function 104 eliminates rays that are too small or too large to be of interest. For example, if a human finger is known to be an object, greater tracking speed and reliability can be achieved if one eliminates consideration of rays which are clearly too narrow to represent the human finger. The filter parameters are generally application dependent and may be modified by user programs.

The TrackRays function 106 tracks the motion of rays which are related to previously known objects and creates a new raypath when a ray is found in the raylist which does not match a ray found in the past. This serves to update positions of rays, check overlap of old and new rays, and recognize merging and splitting of rays such as would occur when one object passes behind another.

The BindDuals function 108, for each pair of sensors tries to find a new raypath for each sensor of the pair with the constraint that the two raypaths must have been created closely together in time. When the BindDuals function 108 finds a pair of raypaths which were created within a sufficiently short time period, it assumes that they are caused by the same object and creates an object data structure to represent the new object. The two raypaths are then bound to the new object which survives until the raypaths bound to it have been deleted. At this point 110, if there are no objects, the TrackObjects function returns control to the calling function 114.

The UpdateExistingObjects junction 112 plays several roles. Where clustered fingers are detected, it checks to see if the size of an object is large enough such that more than one finger should be assumed to be present. It also plots the current position of objects based on the latest information in the raypath structures which have previously been updated by the TrackRays function 104. It also looks for raypaths that have not been previously bound to an object and attempts to bind them to an existing object. Also, the UpdateExistingObjects function 112, when it detects an object structure from each pair of sensors each representing the same physical object, attempts to combine the two object structures into one. It succeeds only if the absolute x-y plane positions of both objects are sufficiently close together.

Figure 20:
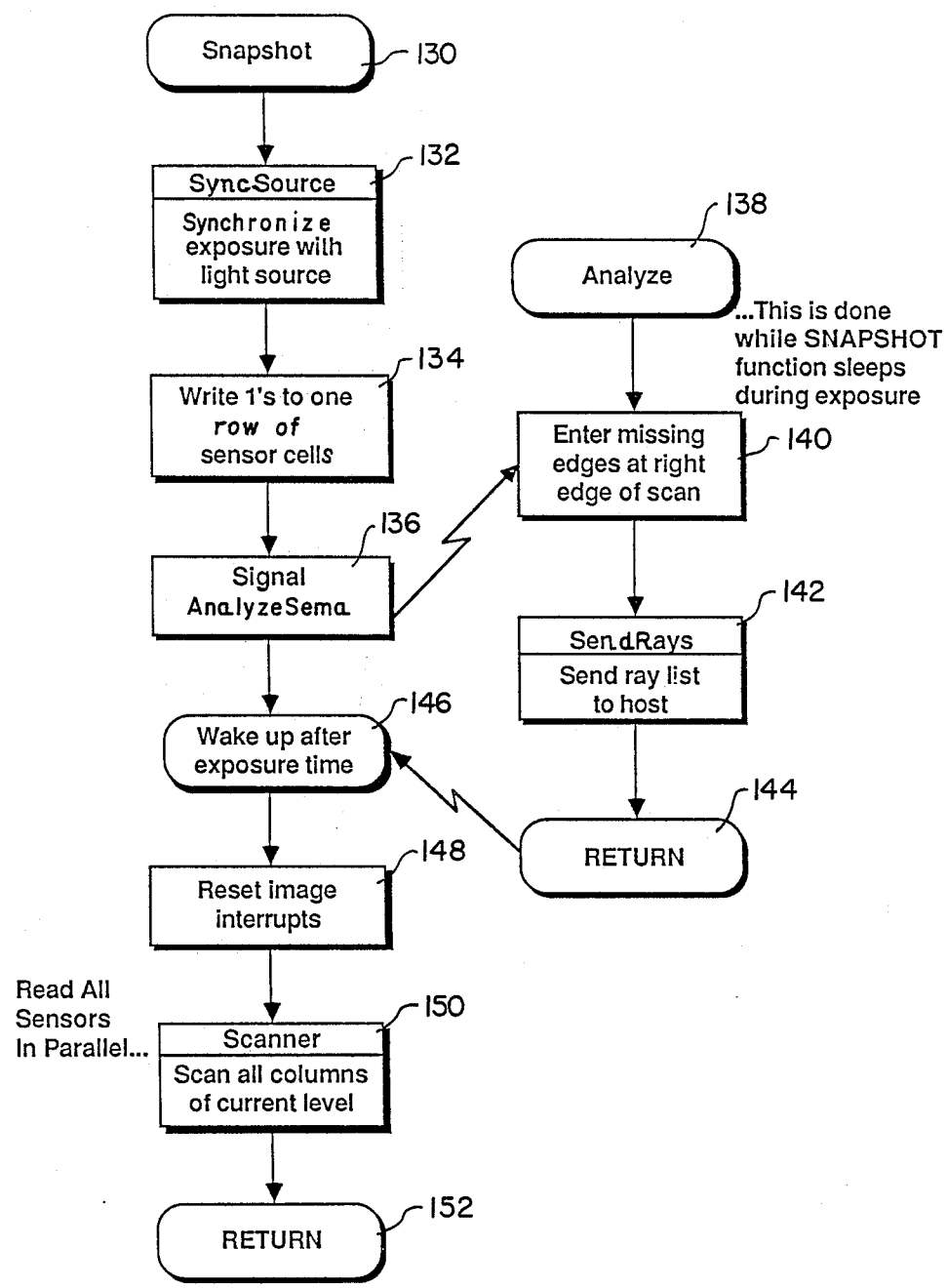

Referring to FIG. 20 there is shown a flow diagram which illustrates a preferred manner of having the controller 64 (FIG. 17) scan the visual field produced by the sensors to obtain raylists.

In FIG. 20, the Snapshot function 130 waits 132 until the light source (which may be a neon or fluorescent tube which preferably flashes on and off at a rate of 60Hz) is at a known brightness level. This is accomplished by synchronizing the sensor write/scan cycle to the 60Hz line frequency used to power the light source. An interrupt from the synchronization circuit 150, 151 (FIG. 18) indicates readiness for an exposure.

After writing "ones" 134 to the appropriate sensor cells to establish them at the "1" level, the Snapshot routine sends a signal 136 to the AnalyzeSema function 138 that it may start processing the results of the previous exposure. While the Snapshot function 130 is waiting for the sensor cells to be exposed 146, the AnalyzeSema function 138 can process the results of the previous exposure 140 and call the SendRays function 142 which send raylists to the host computer 60 by way of the host interface controller 152 of FIG. 21. In this fashion, exposure takes place in parallel with low-level image processing at the controller level. Upon completion of the exposure of the sensors, Snapshot is rescheduled 146 as a consequence of a timer interrupt to the control microprocessor 153 in FIG. 21 from the clock/counter 151 in FIG. 21. It then resets image interrupts 148, and calls the scanner function 150 to read the sensor cells into which 1's were earlier written. Cells which were exposed to light from the light source will be at zero and those blocked by the objects to be sensed will have retained their charge and will, therefore, be read as one's.

The scanner function 150 achieves high efficiency and, therefore, high exposure rates using a combination of software and hardware. The reading of the sensor cells is preferably done not by a loop but by an unfolded sequence of read instructions, one for each cell. Each read instruction reads the same cell for all configured sensors, in parallel. There are no instructions to test the state of the data read in by the read instructions. Eliminating the test and conditional branch instructions makes the scan about three times faster than it would otherwise be.

Figure 21:
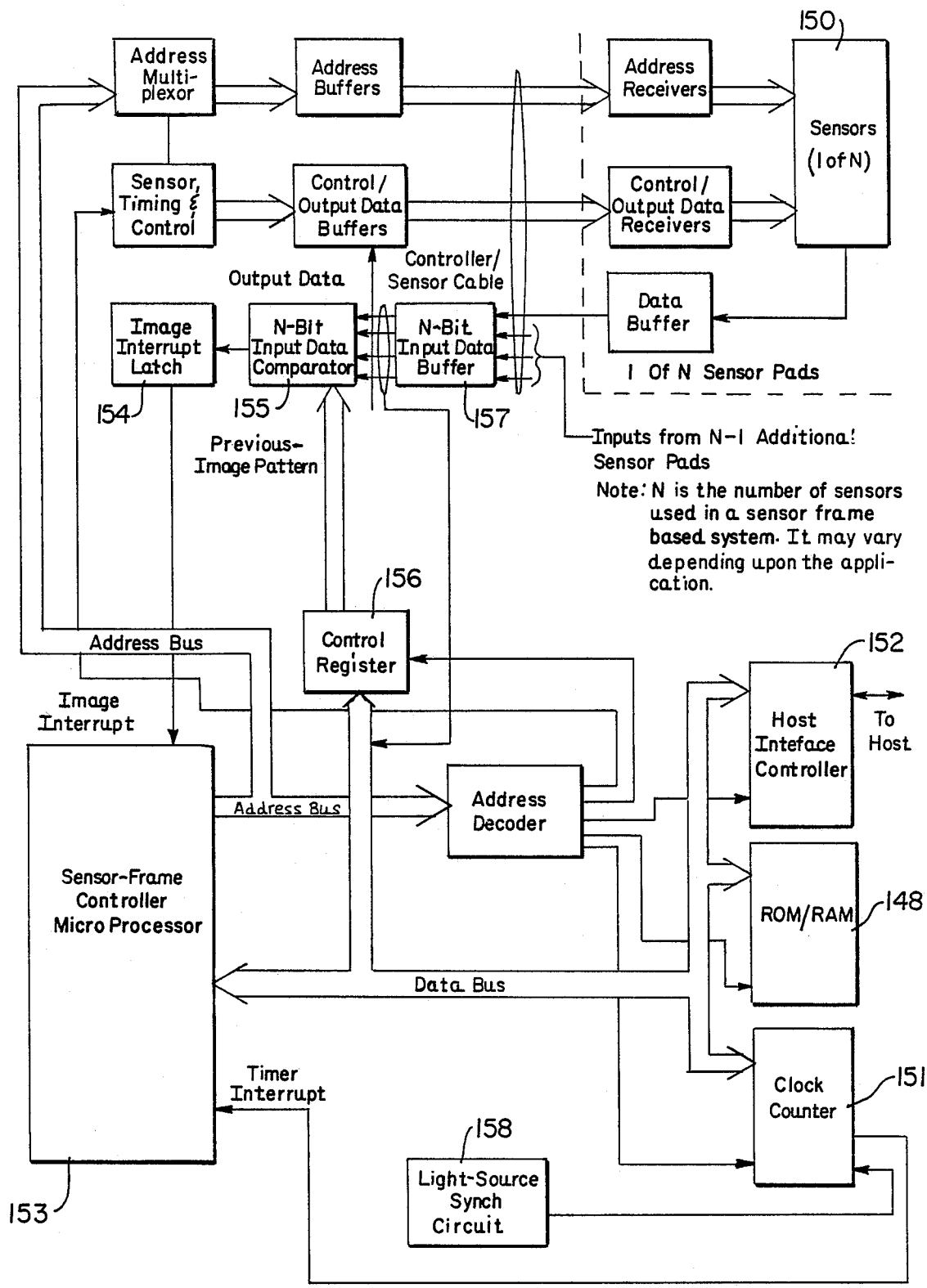
FIG. 21 is a block diagram of a form of controller of the present invention.

Referring still to FIG. 21, before the scanner function 150 reads data from the sensors, it writes all zeroes to the lowest-order N bits of the control register 156, where N is the number of sensors employed in the sensor frame device. When a read of the sensors is subsequently done, the incoming data from the sensors, appearing in the N-bit data buffer 157 is compared by the comparator 155 with the data previously stored in the control register 156. If the newly-read data 157 does not match the previous data 156, the image interrupt latch 154 is set, causing an interrupt to the controller microprocessor 153. The microprocessor 153 cooperates with the clock/counter 151, host interface controller 152, ROM/RAM 148 and light source synch circuit 158.

When this occurs, an image interrupt handling routine uses the read-instruction address at which the interrupt occurred to calculate the column address of the sensor cell at which the pattern change occurred. The newly read N-bit pattern is compared with the pattern previously stored in the control register 156 and for each bit which is different. the column number of the sensor read is stored as an edge in the raylist for the sensor whose input was changed. The new N-bit pattern is then stored in the lowest N bits of the control register 156, and the interrupt handler returns control to the scanner routine which continues reading until another pattern change causes an interrupt, or until all cells in a column of the sensor 150 have been read.

Figure 22:
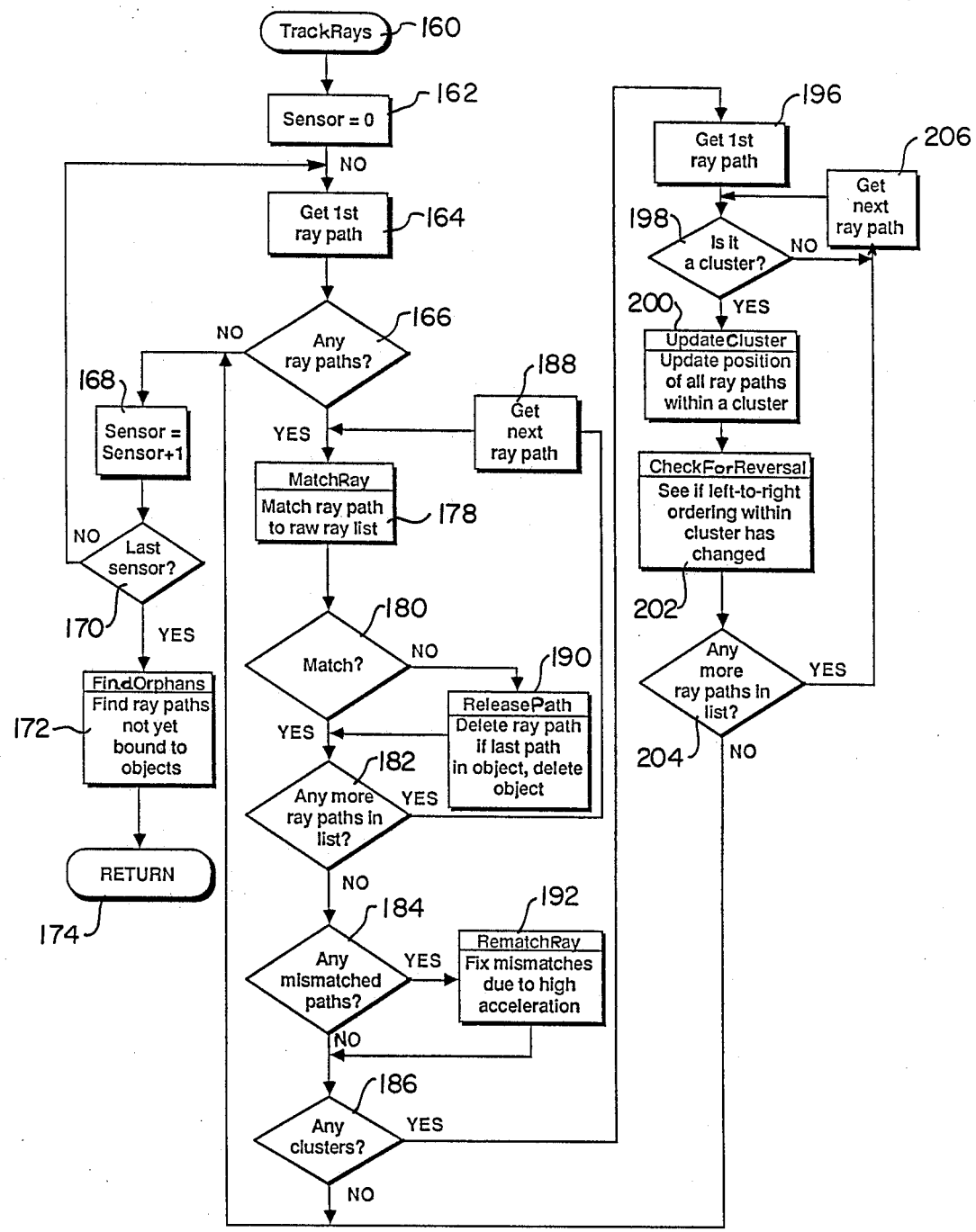
FIG. 22 is a flow diagram of a portion of the software employable in the invention.

FIG. 22 illustrates a flow diagram for the TrackRays function. At the beginning of TrackRays 160, the sensor number is set to 0, and the first raypath is fetched for this sensor 164. If there are no raypaths 166, the sensor number is incremented. If all sensors have been checked for non-empty path lists 170, the FindOrphans function 172 is called to find all rays which could not be matched with already-existing rays (this is how new rays are discovered). After FindOrphans is called, the TrackRays function returns 174. For each sensor having a non-empty list of raypaths, the function TrackRays traverses the raypath list twice. In the first pass (178 to 182) the MatchRay function 178 is called. It takes the previously recorded ray position and uses previously recorded ray velocity information to estimate the ray's current position. If there is no match, the ray is marked for release 190. If the path has remained unmatched for several scans, it is released, and if it is the last path attached to its object, the object is released 190. If there are no more paths in the path list 182 and if there are any unmatched paths 184, an attempt is made to match the rays assuming a higher velocity 192. If on the first traversal of the raypath list any clusters are encountered, a second pass through the list is made (196 through 204). Raypaths which are identified as clusters contain a doubly-linked sublist of ray-paths representing a cluster of occluded objects as seen from one sensor. The UpdateCluster function 200 is called to traverse this sublist, calculating the positions of the rays within the cluster based upon both the left and right edges of the current cluster position and on the edge and object binding attributes of the raypath within the cluster. If the size of a cluster is found to have gone through a local minimum, the CheckForReversal function 202 may be employed to reverse the left-to-right edge-binding attributes of each raypath within the cluster. Edge and object binding attributes will be discussed hereinafter.

The MatchRay function 178 also checks to see if one of two special conditions have occurred. First, if the current raypath sample overlaps more than one ray in the new raylist, a split of the ray cluster has occurred. The raypaths cluster is split into two parts, the position of the split depending upon the position of the newly discovered gap in the raypath cluster currently being matched. Secondly, if a ray in the new raylist overlaps more than one raypath of a given sensor, a merge of two objects (or clusters of objects) has occurred. The two adjacent raypaths are emerged into the same cluster, care being taken to record the raypath "edge-binding" and "object-binding" attributes.

The sensors of the Sensor Frame device focus an image of the frame's light source onto the sensor chip. Where an object such as a human finger blocks the image of the light source, a shadow appears in the focused image. The edges of the shadow correspond to the edges of the occluding object. The term "ray", as used herein, refers to the shadow cast by an occluding object. As the object moves, its ray moves correspondingly.

Figure 23:
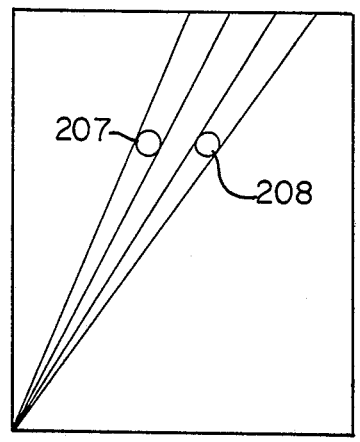
FIGS. 23-39 are schematic illustrations showing the relationship between light occluding objects such as fingers and the light rays, and related notation systems.
Figure 24:
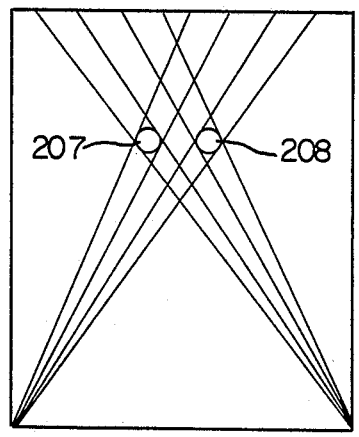
Figure 25:
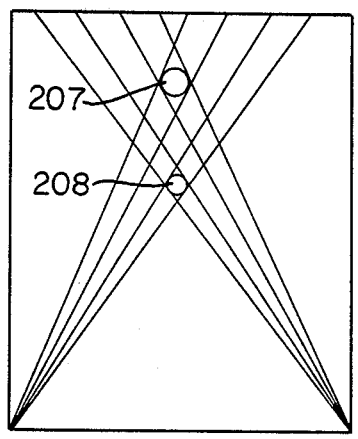

FIG. 23 is a schematic representation of the angles swept out by the two rays produced by two objects 207, 208 in the visual field of the Sensor Frame device. The view is from a position looking into the video display terminal. FIG. 23 shows the rays sensed by a sensor. FIG. 24 shows the rays sensed by two sensors, the other sensor being located in the lower right-hand corner. Because the rays cross in four places rather than two, it is seen that the same pattern of rays can be produced by more than one arrangement of fingers as in, for example, FIG. 25.

Figure 26:
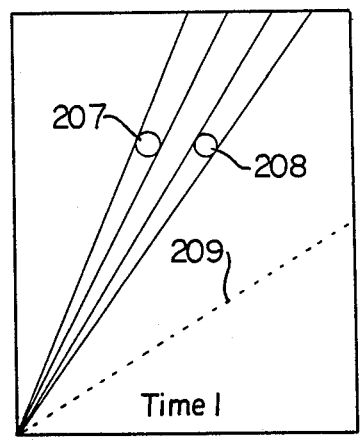

In FIG. 26, there is shown a dotted line 209 to show the edge of the field of view of the bottom-left sensor. Each pair of sensors along each short edge of the Sensor Frame device looks at objects in the opposite half of the image area. Therefore in the case shown, the two bottom sensors look at the top half of the image area, and the two top sensors look at the bottom half of the image area.

For convenience of reference, diagrams of the type shown in FIGS. 23 through 27 will subsequently be referred to as overview notation for the representation of sensed objects.

Figure 28:
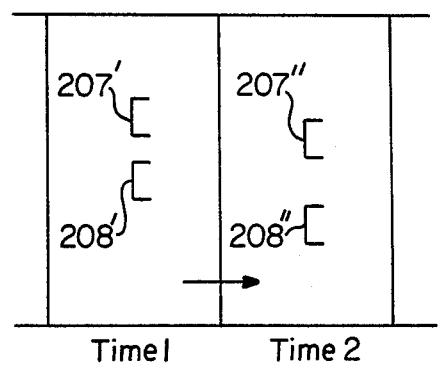

Although overview notation is employed in order to represent objects as seen by more than one sensor, there is a simpler notation for representing the image of one or more objects as seen by only one sensor. This more concise representation, which we will call ray-transition notation or RTN, is shown in FIG. 28. RTN makes it easy to represent sequences of finger positions, just as frames in a strip of movie film are used to give the illusion of motion. In RTN, each frame shows the position of the objects seen by one sensor at a given time. FIG. 28 shows two adjacent frames, or "snapshots" of fingers, at two instants of time. The fingers are represented by the bracket-like objects. One can think of the sensor as sitting off to the left side of the frame, and in the plane of the frame. In this case, an object shown nearer the top of the frame is closer to the left side of the image seen by a sensor, and an object nearer the bottom of the frame is closer to the right side of the sensor image.

Figure 27:
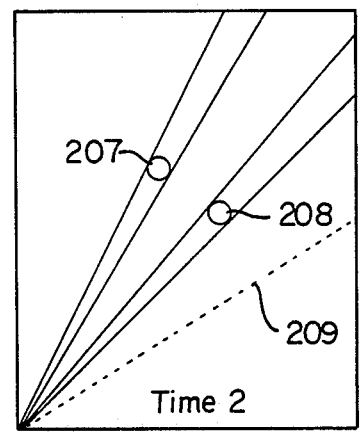

The RTN images taken at time 1 and time 2 in FIG. 28 correspond to the positions shown in FIGS. 26 and 27, respectively, as 207', 208' and 207" and 208".

Figure 29:
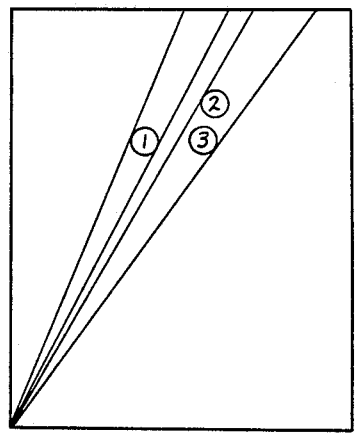
Figure 30:
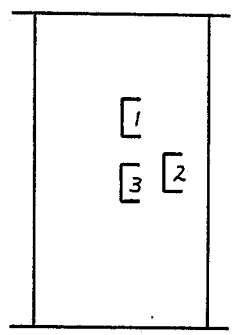

FIGS. 29 and 30 show an occluded object (object 2) in both notations. Again, in the case of the RTN notation, if we think of the sensor as sitting to the left of the RTN frame in the plane of the frame, object 2 will be "behind" object 3.

Figure 31:
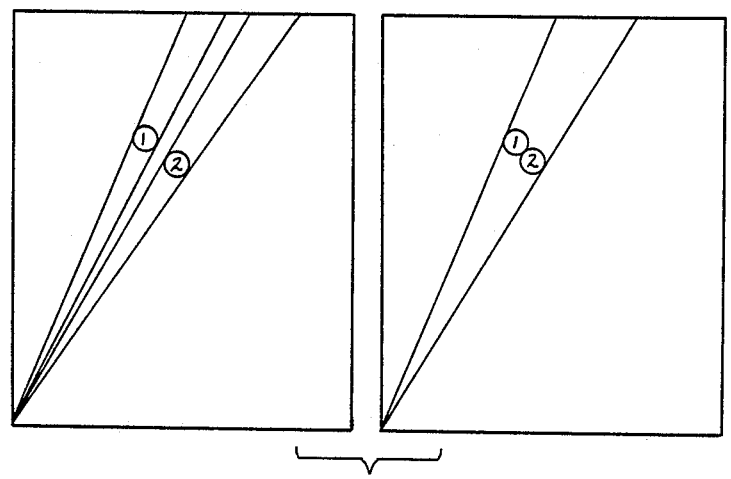
Figure 32:
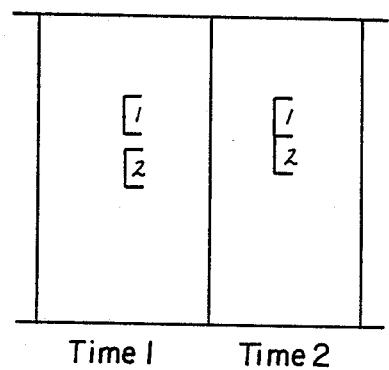
Figure 33:
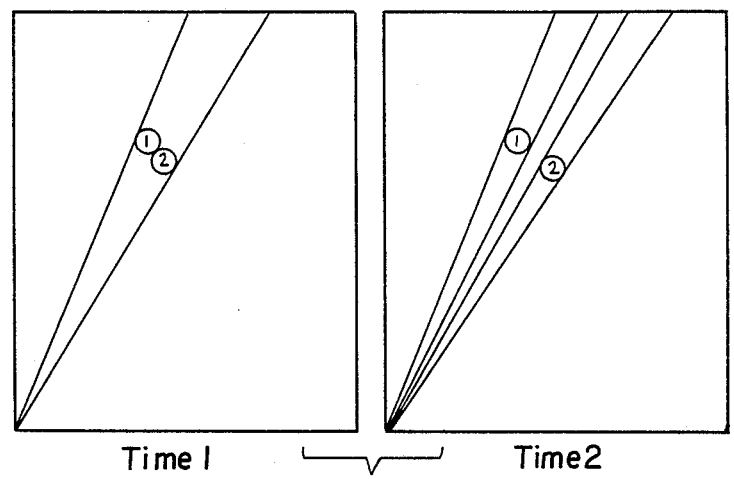
Figure 34:
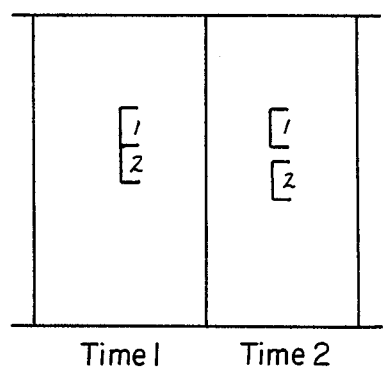

It is important to remember that the Sensor Frame device, in the preferred embodiment, does not produce gray-scale images. Everything is black or white. This means that if two objects move together, as shown in FIG. 31, their interior edges disappear, leaving the impression of one larger object. Of course, it is desired to maintain the distinction between the two objects in spite of this edge occlusion, and the RTN representation of FIG. 32 at "Time 2" continues to show the edge between object 1 and 2; similarly, knowledge of occluded edges is maintained by the Sensor Frame tracking algorithm. FIGS. 33 and 34 show the reverse of the merging of two objects, known as a split.

With these notations available for describing the spatial relations of objects as seen by the Sensor Frame device, one is now in a position to describe how ray and object tracking are accomplished in the present invention.

In the Sensor Frame device, the layer of the software which returns the x and y-axis position, and angle of an object about the z axis, is the "object-tracking" layer, embodied in the function TrackObjects.

Below the object tracking layer is the ray tracking layer, embodied in the function TrackRays which maintains a history of rays for each sensor, and deals with merging the rays when one object moves behind another, and splitting of rays when one object moves out from behind another.

There are data structures common to both the object-tracking levels. They are: (1) RayLists—For each sensor we maintain a list of rays (and their edges) seen in the latest exposure of the sensors. This is the lowest level "raw" data produced by a sensor scan. (2) Raypaths and Path Lists—For each sensor we maintain a linked list of nodes called raypaths. Each raypath contains the last n raylist samples extracted from the raylist for a given object, where n is application-dependent. The linked list of raypaths kept for each sensor is called a path list. An entry in the path list may be a simple raypath or a cluster. A simple raypath represents one sensor's completely unoccluded view of an object (such as a finger). A cluster is a raypath having a doubly-linked sublist of raypaths. Each entry in the sublist is a raypath representing one sensor's view of a partially or fully-occluded object. (3) Objects—Object structures correspond to each physical object discovered by the object-tracking algorithm. For each sensor in whose visual field an object lies (whether or not it is occluded), the internal object structure contains a non-null pointer to a raypath.

A few examples will be given to clarify the purpose and use of these data structures.

Figure 35:
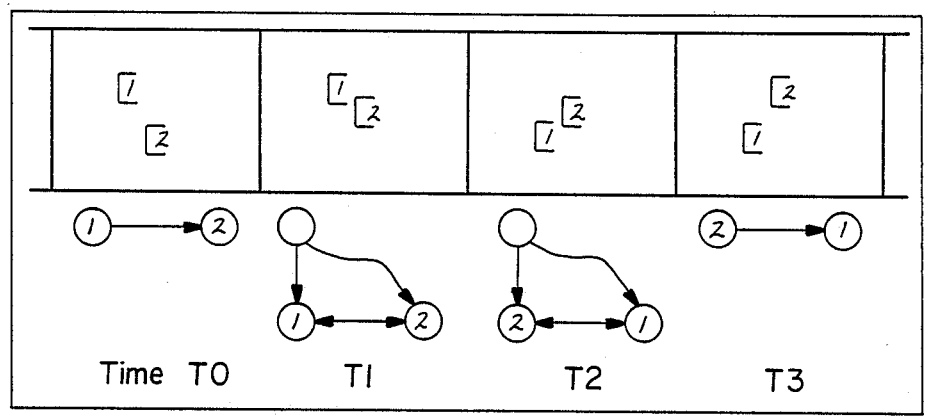

FIG. 35 shows four sequential "snapshots" of an occluded finger. In this case, finger 2 passes behind finger 1, as seen from the left sensor. Below each RTN frame representing the sensed objects is a structural representation of the lists of raypaths used to keep track of object motion at the sensor level.

When a "merge" of the two fingers occurs in frame 2, the current raypath list for the merged rays is pushed down one level, and a new node, representing the clustered raypaths, is inserted at the top level. When finger 2 emerges from behind finger 1 in frane 4, the single ray corresponding to the top-level cluster node splits into two again; the cluster node added in frame 2 is now discarded, and the two original raypath nodes emerge at the top level. If, while the two fingers had been merged, another ray had become occluded, its raypath would have been linked into the list of occluded raypaths with the two preexisting raypaths.

In addition, fingers or other objects will not always make their first appearance unoccluded, as in the above example. In many cases, the existence of multiple fingers in a cluster must be "inferred" if the application demands it.

Figure 36:
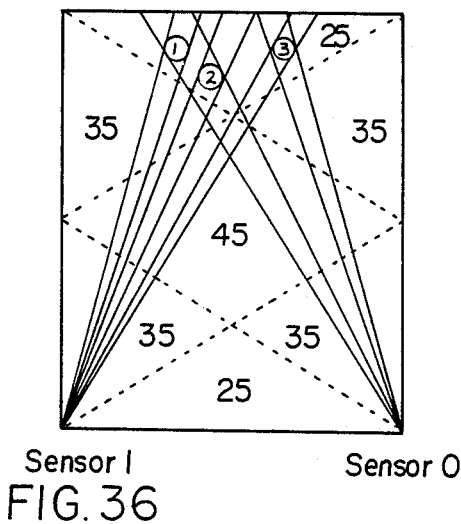
Figure 37:
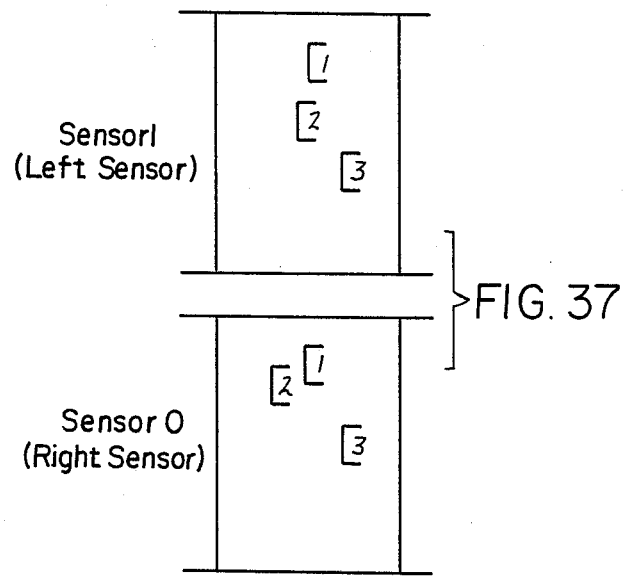

At the top of FIG. 36 is shown an overview-notation diagram of three fingers. Although the left sensor (sensor 1) sees all three fingers distinctly, fingers 1 and 2 are clustered together into one ray from the point of view of the right sensor (sensor 0).

As each sensor has only about a 60-degree field of view, dotted lines have been used in the overview diagram to delineate areas of the visual field in terms of the number of sensors that can sense objects in each area. For example, the "4S" designation in the diamond-shaped area at the center of the overview drawing indicates that four sensors can see an object in that area. Similarly, the "2S" designation in the area populated by the three objects in our example indicate that only two sensors, the bottom pair, can see the three objects.

Figure 38:
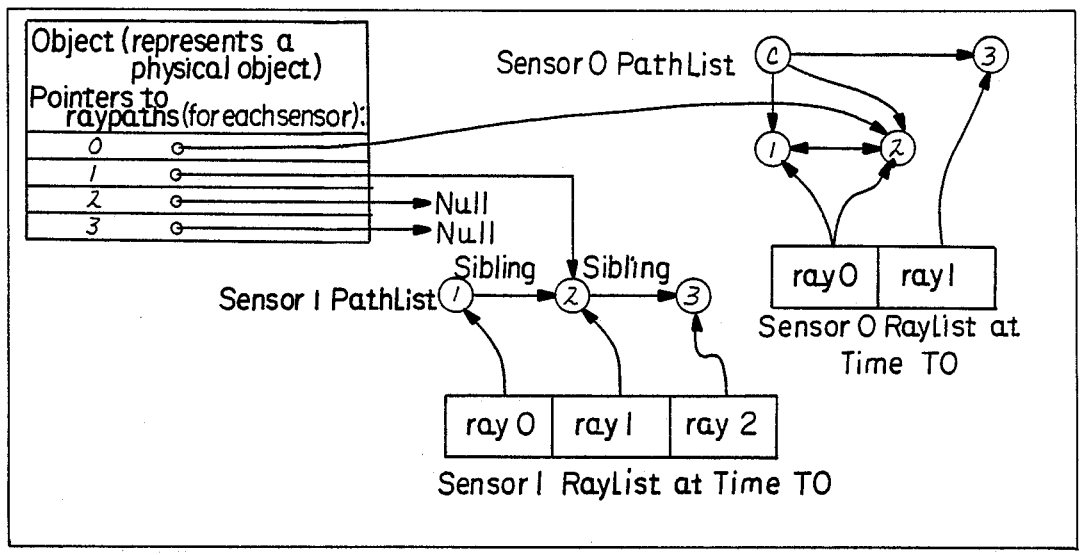

FIG. 38 is an example of the manner in which raylists, raypaths, and path lists, and objects are related within the internal Sensor Frame device data structure.

The representation of an object, in this case the object representing finger 2, is shown in the upper left corner of FIG. 38. The object structure contains, among other things, a pointer to a raypath containing the history of the ray which matches finger 2. This is done for each sensor that can "see" finger 2. Therefore, the object contains null pointers for sensors 2 and 3 (at the top of the frame) because finger 2 cannot be seen by sensors 2 and 3.

In this internal-data-structure diagram, each small rectangular box with a ray number in it represents one of the "raw rays" sensed by the Sensor Frame's optical sensors. A collection of raw rays is called a raylist. In the example, the raylist contains three raw rays for the left sensor, and two for the right sensor. The raylists maintained for each sensor are the lowest level of representation in the sensor frame data structure. Each "snapshot" of the visual field produces a new raylist for each sensor. Each ray in a raylist is used to update the state of one or more raypaths, represented by circles in the data-structure diagram.

When a new raylist becomes available (about every 33 milliseconds, for example), the raypaths attached to existing objects are compared with each new ray to see if there is overlap. In the data-structure diagram, the curved arrows from raw ray 0 of the right sensor raylist to raypaths 1 and 2 indicate that both raypaths match the raw ray, and a case of occlusion exists, or "clustering" of multiple objects within one ray. The curved arrows only indicate a matching. They do not imply that there are pointers from the raw raylist to the raypaths.

The raypath clusters have attributes which allow us to make inferences about the position of a ray after it has become partially (and in some cases fully) occluded.

Figure 39:
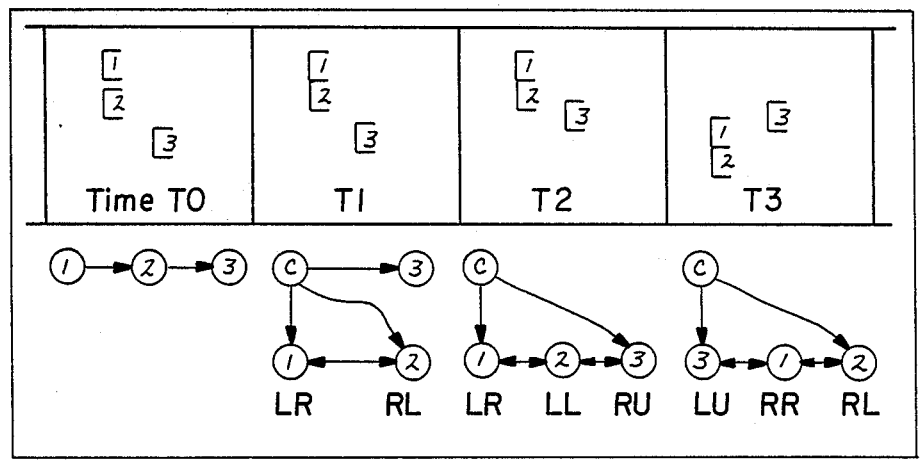

FIG. 39 shows four sequential states of three objects as seen from one sensor. In the first frame, at time T0, none of the three objects is occluded. In the second frame at time T1, objects 1 and 2 have moved together. In the third frame, object 3 has moved behind objects 1 and 2. In the fourth frame, object 3 has begun to emerge from behind the left side of objects 1 and 2, but its right edge is still occluded.

The difference in the relation between objects 1 and 2, on the one hand, and between objects 2 and 3 will be considered. To represent the distinctions some new notation to the data-structure notation for raypaths shown in FIG. 39 needs to be added. In frame 2, when objects 1 and 2 have moved together, their raypaths have been inserted for this sensor into a cluster raypath node, represented by a circle with a C in it in the data structure diagram. The two partially-occluded objects are in a doubly-linked list attached to the cluster node. Below each occluded-raypath node in the data structure diagram are two letters. The letter on the left is called the edge-binding attribute of the raypath. This attribute tells us how to infer the angular position of the occluded edge(s) of a ray relative to the two edges of the cluster that are still visible. The cluster C always represents a ray (really a shadow) into which one or more others have merged. Therefore, it will always have two visible edges, even when the cluster overruns the edge of a sensor's field of vision.

The edge-binding attribute can have one of five states: (a) Unattached, (b) Left, (c) Right, (d) Interpolated, and (e) Velocity. The meaning of these states is as follows: Unbound is the initial state of an unoccluded ray. Left means that the raypath moves in concert with the left edge of the cluster. Whatever movement is made by the left edge of the cluster is also made by the left-edge-bound raypath. Right means that the raypath moves in concert with the right edge of the cluster. Whatever movement is made by the right edge of the cluster is also made by the right-edge bound raypath. Interpolated means that the angular position of the raypath is interpolated between the left and right edges of the cluster. This mode will be elaborated further when we discuss object binding. Velocity means that the raypath is totally occluded and that it is not bound to an edge i.e.—the information is not available from the point of view of this sensor. In this case, we infer the raypath position by assuming that it will continue in uniform continuous motion (its past velocity is known) until we have data from other sensors to correct its position.

Returning to FIG. 39, note what happens to the edge-binding attribute of each raypath as the raypath becomes occluded. At time T1 (frame 2), objects 1 and 2 have merged, so that the sensor sees a cluster consisting of the left side of raypath 1 and the right side of raypath 2. Therefore, the edge-binding attribute in the time T1 data structure diagram for raypaths 1 and 2 is L and R, respectively. The edge-binding attribute is the letter shown below the raypath node on the left side.

The letter on the right below each clustered raypath node is called the object-binding attribute. This attribute tells us, using knowledge from one or more other sensors, whether the two objects represented by two adjacent raypaths are in fact close enough together in the x-y plane to be attached, or travelling together. This knowledge is important, because if we know that two fingers, for example, are normally attached, we can, under certain conditions, make useful inferences about their location even when one or more fingers become totally occluded to all sensors.

This is what has happened at time T2 in FIG. 39. The object represented by raypath 2 has become totally occluded. It cannot be seen from either the left or the right side of the cluster. Yet its position can be determined because it is known that it is attached to object 1, but not to object 3.

Object-binding attributes may have one of four states: (a) Unattached, (b) LeftObject, (c) RightObject, and (d) BothObjects. The meaning of these states is as follows: Unattached means that the object represented by the raypath is not attached to any other object. LeftObject means that the object represented by the raypath is attached to the object represented by the raypath immediately to the left. RightObject means that the object represented by the raypath is attached to the object represented by the raypath immediately to the right. BothObjects means that the object represented by the raypath is attached to the object represented by the raypath immediately to the left and to the object represented by the raypath immediately to the right. It is attached to both its neighbors.

Returning to the description of the edge and object-binding attributes of the raypath nodes, the attributes of the nodes progressing through the frames of FIG. 39 have been "marked". At time T1, raypath or path 1 is bound to the left edge, and path 2 to the right edge of the cluster. Because it was found at the object level that paths 1 and 2 are very close to each other in the x-y plane, the object binding of path 1 is set at R, to indicate that it is "attached" to the object represented by the path on its right, namely path 2. Similarly, path 2's object binding is set to L, to indicate that it is attached to the object represented by the raypath on its left, namely path 1. We can say that path 1 and 2 are "attached".

At time T2, object 3 gets involved in the cluster by moving behind objects 1 and 2 from the right. From other sensors, it is known that it is not close to object 2. Also, note that path 2's right edge is now occluded. However, since it is attached to path 1, and not to path 3, its edge binding is changed to L, or left. This means that although one can no longer "see" path 2 from this sensor, we can infer its position relative to path 1, to which it is bound, and from this, its position relative to the left edge of the cluster.

At time T2, the edge-binding of path 3 is set to R (right), but its object-binding attribute is set to U, or Unattached.

At time T3, path 3 passes behind paths 1 and 2, and reappears on the left. Its reappearance at the left side of the cluster can be predicted and detected if its velocity remains relatively constant after it becomes completely occluded. These examples have been provided in order to clarify the role of edge and object-binding attributes in inferring the position of occluded objects. With an understanding of the edge and object binding attributes, one can gain enhanced understanding of the MatchRay function 178 (FIG. 22) in greater detail.

Figure 40:
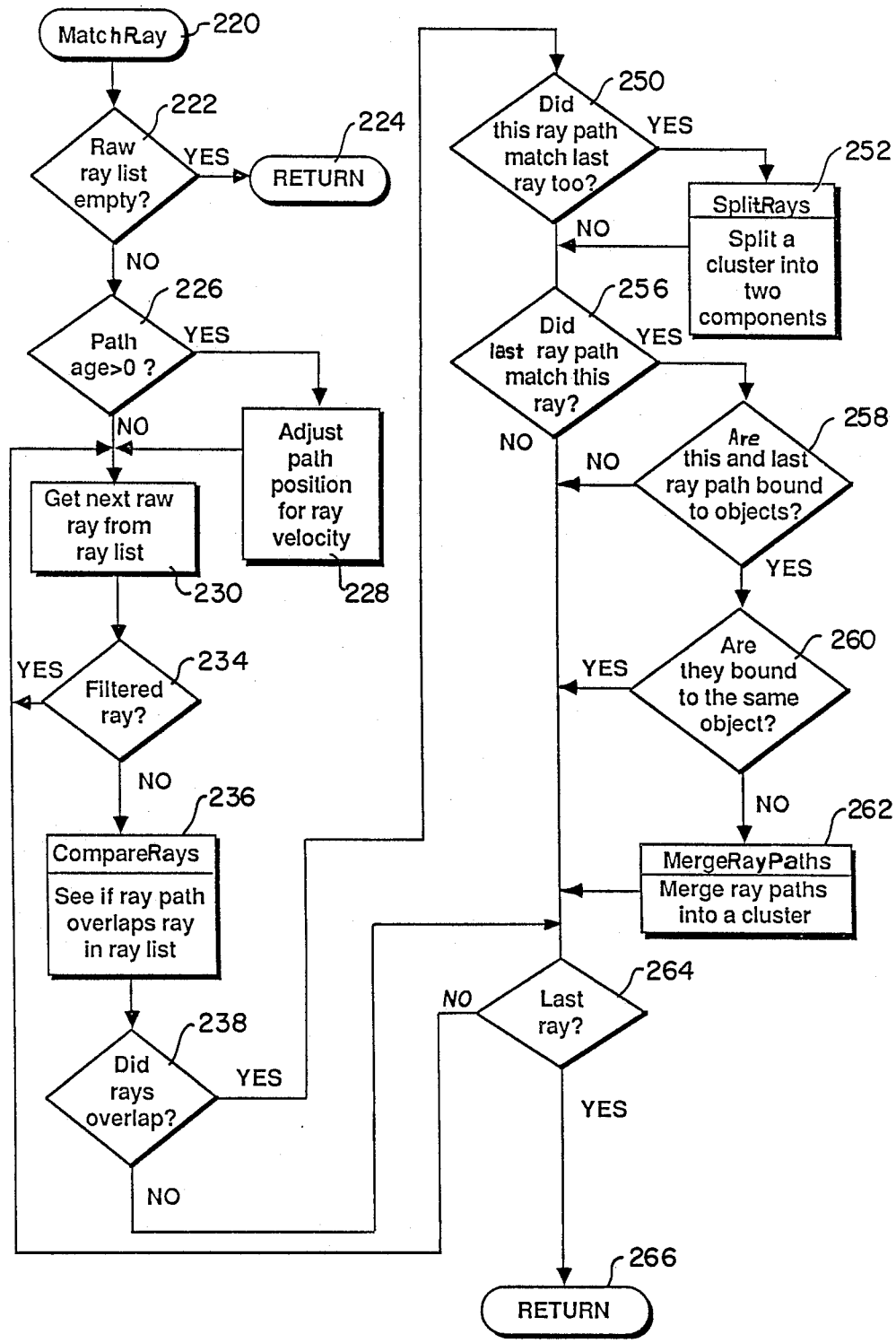
FIGS. 40-43 are flow diagrams of portions of software employable in the invention.

FIG. 40 illustrates the MatchRay function 220. When the function is called, it returns 224 if the raw raylist is empty 222. If the current raypath is not a new one 226, it infers the present raypath position from knowledge of its previous position and velocity 228.

Operations 230 through 264 in FIG. 40 comprise a loop which attempts to find overlap between the current inferred position of the raypath and each raw ray in the current raylist for the current sensor. (The raw rays represent updated position information for each raypath.)

For each raw ray in turn 230, it: (1) rejects it if it is too small or too large 234; (2) compares it with the current raypath to see if there is overlap 238; (3) if there is overlap, and if the current raypath also overlapped the previous raw ray 250, then the ray has split, and if the raypath is a cluster it must be divided into two discrete clusters by the SplitRays function 252; (4) if it is found 256, that the current raw ray (in the raylist) also matched the previous raypath for this sensor, then the current and previous raypaths have merged; if the current and previous raypaths are not bound to the same object, we can assume that two distinct objects have merged from the point of view of the current sensor 258 and 260, and the MergeRayPaths function is called 262; (5) if there is no overlap between the current raypath and the current ray ray 238, the next raw ray is fetched. If the last raw ray has been examined 264, MatchRay returns 266.

Figure 41:
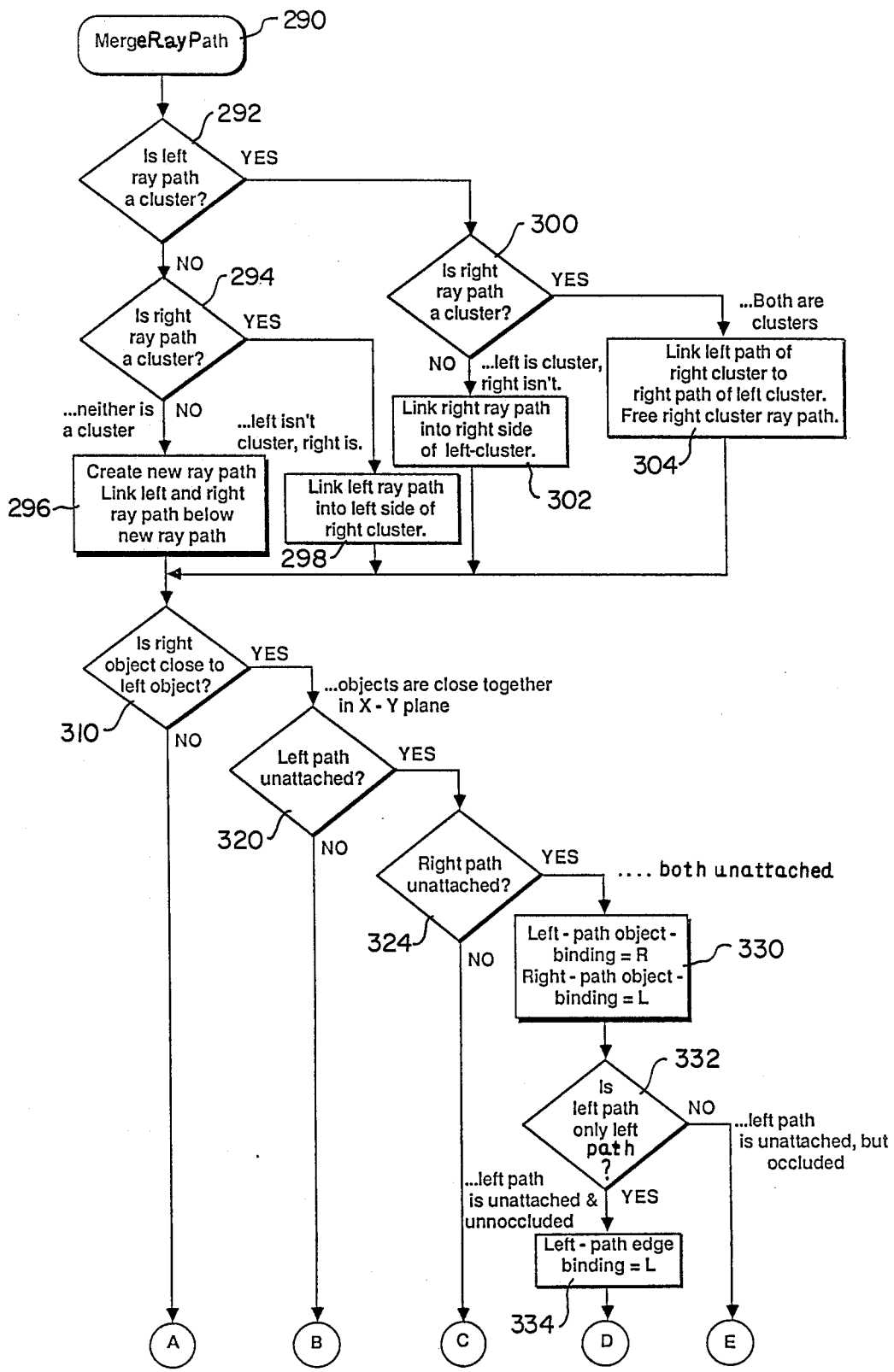
Figure 42:
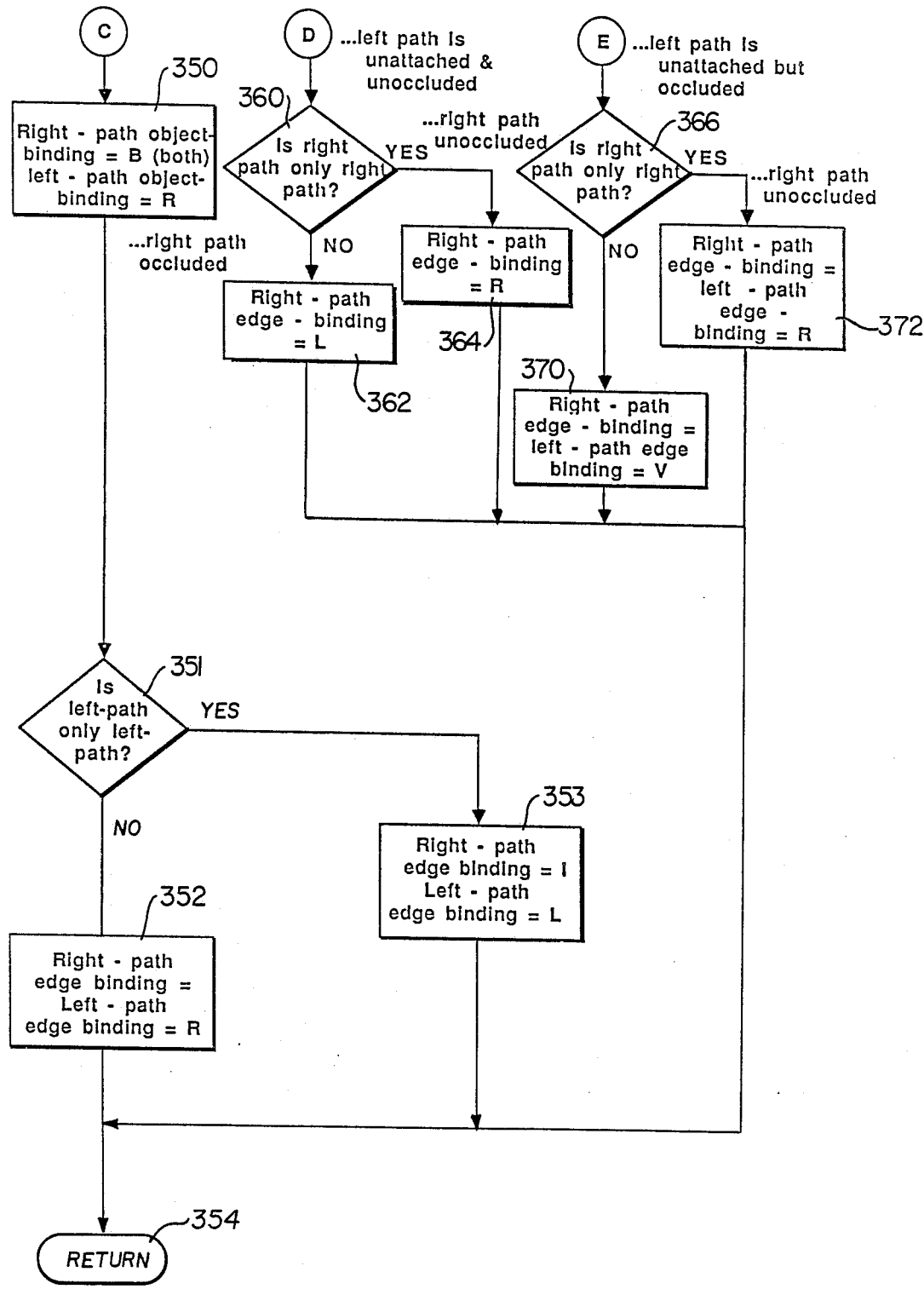
Figure 43:
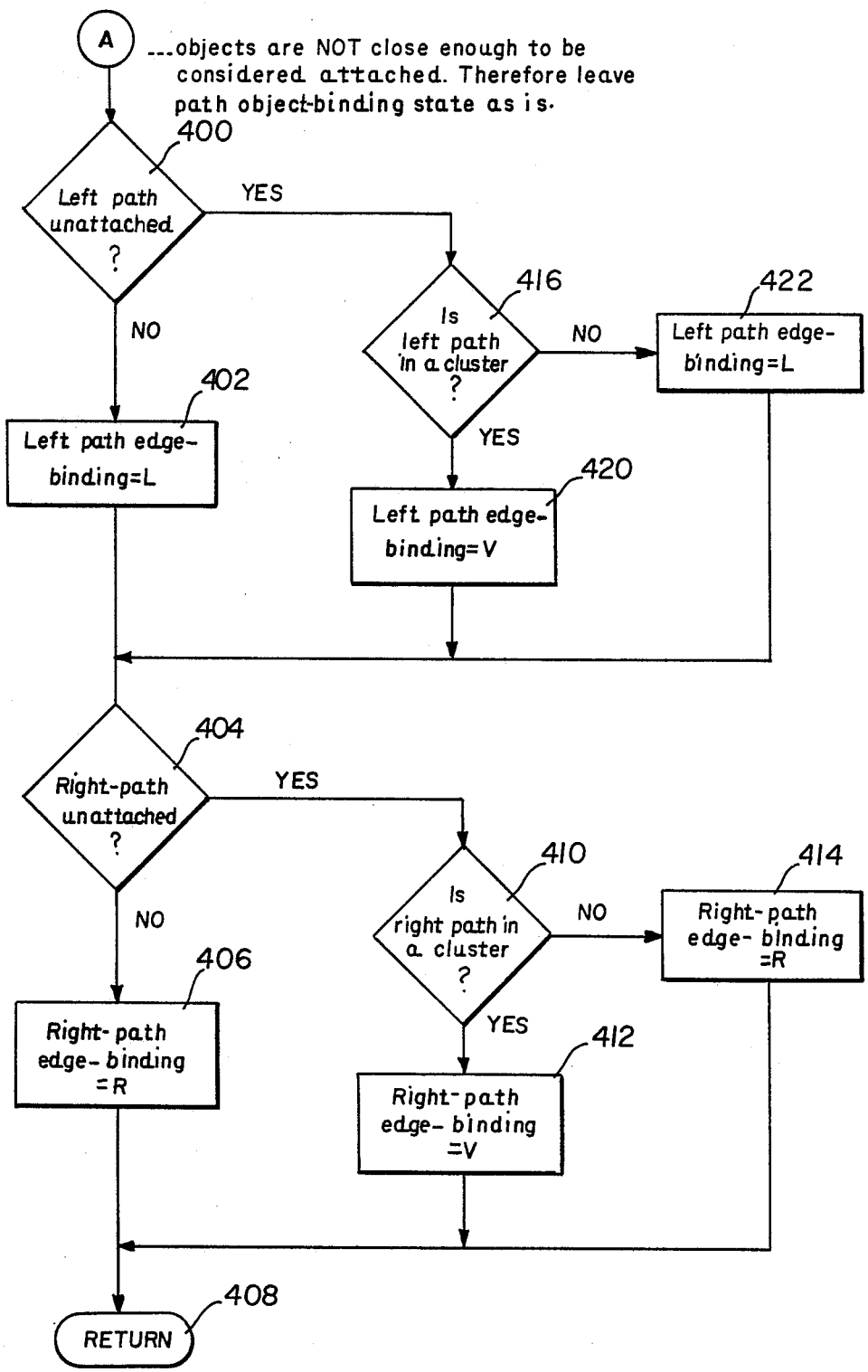

Referring to FIGS. 41–43, the MergeRayPaths function setting of edge and object binding attributes during the merging of rays is what permits the ray-tracking function to infer the positions of the occluded rays and therefore the positions of occluded and partially-occluded objects. The MergeRayPaths function is included in its entirety as it is important in determining the effectiveness of the Sensor Frame in tracking occluded objects.

MergeRayPaths can be divided into two logically independent parts. The first part, from portion 290 in FIG. 41, up to but not including portion 310, is concerned only with the mechanisms of merging the data structures of each of the two merging raypaths or raypath clusters into one cluster, and is readily understood by one skilled in the art.

Figure 42B:
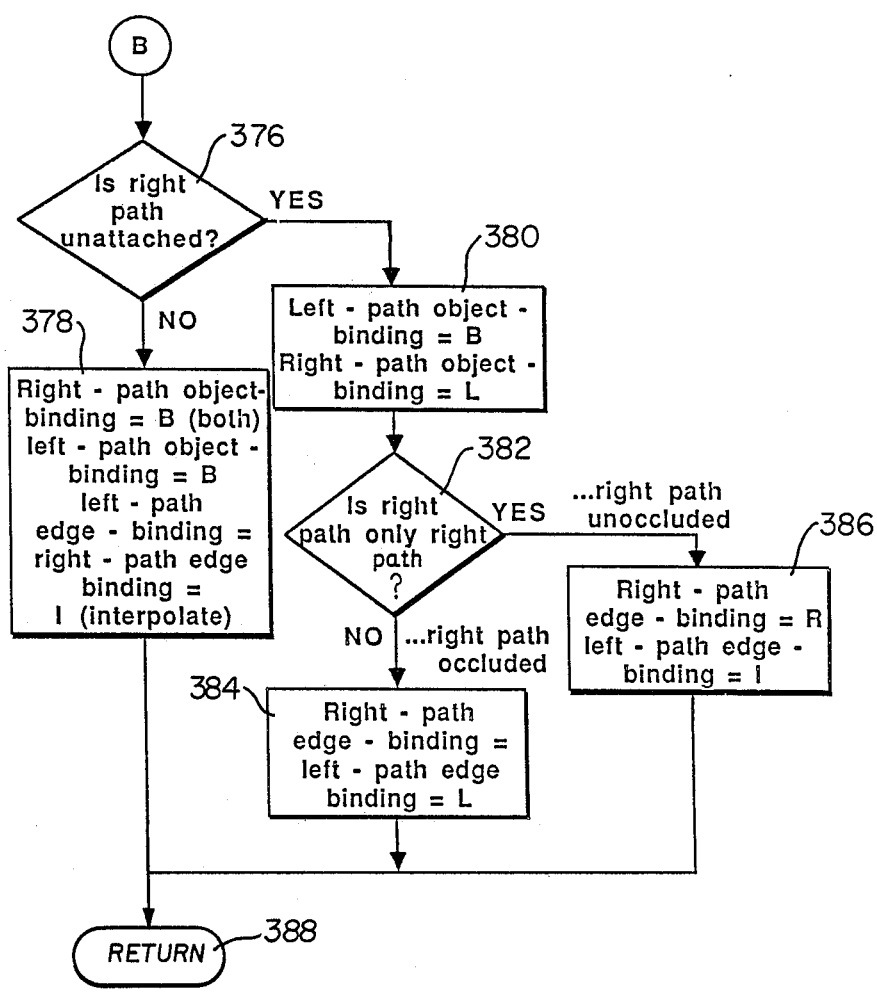

The second part of MergeRayPaths from portions 310 through portions 354, 388 and 408 in FIGS. 42a, 42b and 43, respectively, contain the ray and edge-binding algorithms employed in the operation of a peripheral-scan multi-object scanning device such as the Sensor Frame device.

If the raypaths to be merged are raypaths of objects which are close together in the x-y plane 310, one then determines whether the left raypath's object was previously unattached 320. If it was attached, one then determines whether the right path's object was previously unattached 376. If it was attached, then both objects are to be attached in both directions 378. If the right path's object was unattached, it is bound to the left path's object, and the left path's object is bound in both directions 380. If the right path is occluded 382, both the right and left paths have their edge-binding attribute set to "BindToLeftEdge" 384. Otherwise, as the right path is unoccluded, its edge-binding is set to "BindToRight-Edge", and the left path's edge-binding is set to "interpolate" 386.

If at 320, the left raypath's object was found to be previously unattached, one determines whether the right raypath's object was unattached 324. If it was attached, then the right path's object is bound in both directions, and the left path's object is bound to the right path's object 350. If the left path is unoccluded 351, its edge binding is set to "BlindToLeftEdge", and the right path's edge binding is set to "Interpolate" 353. If the left path is occluded, both paths'edge binding is set to "BindToRightEdge" 352.

If at 324, the right raypath's object was unattached, then the objects of both raypaths were previously unattached, and the left object is attached (bound) to the right and vice-versa 330. One then determines whether the left path was previously unoccluded 332. If so, the left path edge binding is set to "BindToLeftEdge" 334. One then determines whether the right path was occluded 360. If it was, its edge binding is set to "BindToLeftEdge", otherwise it is set to "BindToRightEdge".

If at 332, it was determined that the left path was occluded, one determines whether the right path is also occluded 366. If it is, the edge binding of both the left and right raypaths is set to "Velocity" since they are both completely occluded and unattached to anything but each other 370. If the right path is not occluded, the edge-binding of both paths is set to "BindToRightEdge".

If at 310, it was found that the objects represented by the left and right raypaths were not close together in the x-y plane, one then determines whether the left path is already attached 400. If it is, its edge-binding is set to "BindtoLeftEdge" 402. If not, one determines whether the left path is in a cluster 416. If so, the left path edge-binding is set to "Velocity" because it is completely occluded and unattached 420. If not, its edge-binding is set to "BindToLeft Edge" 422.

One then determines whether the right raypath is already attached 404. If it is, the right path edge-binding is set to "BindToRightEdge" 406. If not, one determines whether the right path is in a cluster 410. If it is, its edge-binding is set to "Velocity" because it is completely occluded and unattached 412. If not, its edge-binding is set to "BindToRightEdge" 414. The function returns at 408.

It will be appreciated that the sensors will emit an electrical signal corresponding to the individual cells of the sensor array which were recipients of light and that a suitable controller (FIG. 21) will relate the signal to the specific position and, if desired, velocity of the light occluding objects and may isolate certain graphic objects based upon such occlusion. Velocity would be determined by comparing position changes of the objects as related to time.

It will be appreciated that the method and apparatus of the present invention may involve providing a video monitor, an adjacent frame, a plurality of optical sensors generally facing the frame interior and illuminating at least a portion of the space defined by the frame. A plurality of light occluding objects are employed to obstruct a portion of the light from reaching certain cells of the sensors. Signals are emitted from the sensors corresponding to the three-dimensional positions of the light occluding objects with respect to the frame.

It will be appreciated that, while a suitable protective dust cover could be placed over the frame when it is not in use to resist undesired entry of foreign matter, such frame has not been illustrated in the drawings.

While reference has been made herein to use of multiple fingers within the frame, it will be appreciated that the invention is not so limited and that feet, wands or other physical objects or combinations thereof may be employed effectively.

It will be appreciated that while the disclosure has focused on examples of use of a single frame, it will be appreciated that a number of frames may be employed in adjacent areas if desired.

It will be appreciated that while primary reference has been made herein to modification of graphic objects and that a wide variety of uses such as in connection with computers generally, musical keyboards, computer aided design systems and safety devices for industrial equipment will become apparent to those skilled in the art, numerous other uses may exist.

In a preferred approach to the invention, the scanning of the visual field by means of the sensors can be effected rapidly on the order of about 30 to 60 times per second, for example.

It will be appreciated that while for convenience of illustration a frame which is generally rectangular has been shown, the invention is not so limited. It is preferred that the frame be a closed figure or substantially closed, that it be provided with a suitable number of sensors with four being the preferred minimum number (although two sensors may be employed in certain specialized situations) and there being no maximum and that the light illumination be substantially uniform. It will be appreciated that the frame may be square, circular or of any other desired shape so long as the light field and associated sensors will permit effective determination of position and/or shape of a light occluding object and that determination of velocity, if desired, is permitted.

It will be appreciated that while for clarity of disclosure reference has been made herein to positioning of the frame adjacent to a video monitor, such positioning is not required. The frame may be used without the video monitor, if desired.

While certain examples of use of the invention have been provided a large number of additional uses will be apparent to those skilled in the art. For example, the system may be employed to play a digital musical organ by permitting the output of the sensors to operate the organ. Also, the system is compatible with speech activated computer operations. This facilitates flexibility of use of the system.

It will be apparent to those skilled in the art that there are numerous end use applications of the method and apparatus of this invention. A basis use would be for gesture sensing devices in computer based workstations. The invention could be used in industrial processes and in safety devices in an industrial environment. The system could also be used in robotic systems and systems for the handicapped, for example.

It will be appreciated, therefore, that the present invention provides a method and apparatus for permitting efficient selection and manipulation of graphic objects through determination of the position and velocity of a plurality of light occluding objects by peripheral scan means. This is accomplished through the use of a video monitor, a frame having sources of illumination, optical sensors at predetermined positions and processing of the signals emerging from said sensors.

Whereas particular embodiments of the invention have been disclosed for purposes of illustration, it will be evident to those skilled in the art that numerous variations of the details may be made without departing from the invention as defined in the appended claims.

I claim:

1. A method of manipulating graphic objects comprising
   providing a frame, and a plurality of optical sensors generally facing the frame interior,
   illuminating at least a portion of the space defined by said frame,
   employing a plurality of light occluding objects to obstruct a portion of the light from reaching at least certain elements of said sensors, and
   emitting signals from said sensors corresponding to the positions of said light occluding objects with respect to said frame.

2. The method of claim 1 including
   providing a video monitor, and
   positioning said frame adjacent to said video monitor.

3. The method of claim 1 including
   periodically combining said sensor signals to provide information regarding changes in position of said light occluding objects.

4. The method of claim 3 including
   storing a first set of said sensor signals corresponding to a first position of said light occluding objects and obtained at a first time, and
   subsequently comparing said first set of sensor signals with a second set of said sensor signals obtained at a second time to determine changes in position of said light occluding objects.

5. The method of claim 4 including
   employing said comparison to determine the velocity of said light occluding objects.

6. The method of claim 4 including
   employing said comparison to determine the orientation of said light occluding objects.

7. The method of claim 4 including
   comparing a plurality of sets of said sensor signals with each being obtained at a different time, and
   employing said sets to determine changes in position of said light occluding objects.

8. The method of claim 4 including
   employing said sensor signals to move said graphic objects.

9. The method of claim 8 including
   scanning said sensors at a rate of at least about 30 times per second.

10. The method of claim 8 including
    employing at least four said sensors.

11. The method of claim 10 including
    providing a generally rectangular frame, and
    positioning said sensors generally at the corners of said rectangle.

12. The method of claim 4 including
    employing computer means to store and compare said sensor signals.

13. The method of claim 2 including
    employing portions of the human body as said light occluding objects.

14. The method of claim 13 including
    employing a plurality of fingers as said light occluding objects.

15. The method of claim 13 including
    determining the position and velocity and orientation of said light occluding objects.

16. The method of claim 15 including
providing said frame as a closed frame, and
illuminating the interior of said frame substantially uniformly.

17. The method of claim 16 including
employing dynamic RAM sensors as said sensors.

18. The method of claim 17 including
positioning said frame adjacent to said video monitor, and
employing a rectangular frame with four said sensors.

19. The method of claim 18 including
employing said light occluding objects to select and manipulate at least one graphic object.

20. The method of claim 19 including
employing said light occluding objects information to modify said graphic object.

21. The method of claim 19 including
employing at least two fingers to define a said graphic object.

22. The method of claim 21 including
employing said sensors to monitor zones disposed remote from said sensors with respect to the presence of light occluding objects therein.

23. The method of claim 22 including
providing said illumination from sources extending about the periphery of the frame.

24. The method of claim 1 including
determining the shape of said occluding objects.

25. The method of claim 7 including
positioning said frame in front of a video monitor.

26. The method of claim 7 including
maintaining said sensor cells in a "one" state before introduction of said light occluding objects into light obstructing positions, and
maintaining said "one" state on cells having light occluded by said light occluding objects.

27. The method of claim 6 including
determining the attributes of raypaths bound to partially or fully occluded objected by monitoring ray edge-binding and object-binding attributes of said objects.

28. Apparatus for manipulating graphic objects comprising
frame means for at least partially receiving a plurality of light occluding objects,
light source means at least partially illuminating the region adjacent said frame means,
sensor means operatively associated with said frame means for receiving at least a portion of said illumination and emitting responsive signals, and
signal processing means for employing said sensor signals to determine the position of said plurality of light occluding objects.

29. The apparatus of claim 28 including
a video monitor disposed adjacent to said frame means.

30. The apparatus of claim 29 including
said frame means being disposed in front of said video monitor with at least a portion of said monitor being visible through said frame.

31. The apparatus of claim 28 including
said signal processing means having means for comparing a first set of said sensor signals taken at a first time with a second set of signals taken subsequently in order to determine changes in position and orientation of said light occluding objects.

32. The apparatus of claim 31 including
said signal processing means having means for storing and comparing a plurality of sensor signal sets to determine changes in position in said light occluding objects.

33. Apparatus for manipulatign graphic objects comprising
frame means for at least partially receiving light occluding objects,
light source means at least partially illuminating the region adjacent said frame means,
sensor means operatively associated with said frame means for receiving at least a portion of said illumination and emitting responsive signals,
signal processing means for employing said sensor signals to determine the position of said light occluding objects,
said signal processing means having means for comparing a first set of said sensor signals taken at a first time with a second set of signals taken subsequently in order to determine changes in position of said light occluding objects,
said signal processing means having means for storing and comparing a plurality of sensor signal sets to determine changes in position in said light occluding objects, and
said signal processing means having means for determining velocity and orientation of said light occluding objects.

34. The apparatus of claim 33 including
said signal processing means having computer means.

35. The apparatus of claim 33 including
said signal processing means having means for manipulating said graphic objects responsive to the information received from said sensors.

36. The apparatus of claim 28 including
said sensor means having a plurality of dynamic RAM sensors.

37. The apparatus of claim 33 including
said signal processing means having means for determining angle and z axis position of said light occluding objects.

38. The apparatus of claim 36 including
said sensor means employing at least four said dynamic RAM sensors.

39. The apparatus of claim 38 including
lens means disposed adjacent said dynamic RAM sensors for focusing light thereon.

40. The apparatus of claim 39 including
said frame means being generally rectangular, and
said dynamic RAM sensors disposed generally in the corners thereof.

41. The apparatus of claim 36 wherein
said dynamic RAM sensors having rectilinear arrays of sensor cells.

42. The apparatus of claim 40 including
said sensors being secured to said frame.

* * * * *

UNITED STATES PATENT AND TRADEMARK OFFICE
CERTIFICATE OF CORRECTION

PATENT NO. : 4,746,770
DATED : May 24, 1988
INVENTOR(S) : PAUL McAVINNEY

It is certified that error appears in the above-identified patent and that said Letters Patent is hereby corrected as shown below:

Column 1, line 47, "vodeo" should be --video--.

Column 5, line 29, "is" should be --a--.

Column 5, line 62, "it is" should be --is it--.

Column 10, line 25, "junction" should be --function--.

Column 11, line 38, the period "." after "different" should be a comma --,--.

Claim 27, col. 21, line 40, "objected" should be --objects--.

Claim 33, col. 22, line 11, "manipulatign" should be --manipulating--.

Signed and Sealed this

Twenty-fourth Day of October, 1989

*Attest:*

DONALD J. QUIGG

*Attesting Officer*   *Commissioner of Patents and Trademarks*